US009875603B2

(12) United States Patent
Arora et al.

(10) Patent No.: US 9,875,603 B2
(45) Date of Patent: *Jan. 23, 2018

(54) GAMING SYSTEM AND METHOD PROVIDING A MULTIPLAY GAME WITH RESULTANT SYMBOLS

(71) Applicant: IGT, Las Vegas, NV (US)

(72) Inventors: Prashant Arora, Mountain View, CA (US); Leandro Basallo, San Francisco, CA (US); Scott A. Caputo, Santa Clara, CA (US); Timothy L. Isaacson, Hayward, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,684

(22) Filed: May 16, 2016

(65) Prior Publication Data

US 2016/0260282 A1 Sep. 8, 2016

Related U.S. Application Data

(63) Continuation of application No. 14/797,921, filed on Jul. 13, 2015, now Pat. No. 9,349,243, which is a (Continued)

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.
CPC ...... *G07F 17/3213* (2013.01); *G07F 17/3258* (2013.01); *G07F 17/3267* (2013.01); *G07F 17/3276* (2013.01); *G07F 17/34* (2013.01)

(58) Field of Classification Search
USPC ..................................................... 463/16–25
See application file for complete search history.

(56) References Cited

U.S. PATENT DOCUMENTS 5,209,479 A 5/1993 Nagao et al.
5,224,706 A 7/1993 Bridgeman et al.
(Continued)

FOREIGN PATENT DOCUMENTS

AU 198774936 9/1987
AU 199717601 9/1997
(Continued)

*Primary Examiner* — Ronald Laneau
(74) *Attorney, Agent, or Firm* — Neal, Gerber & Eisenberg LLP

(57) ABSTRACT

Various embodiments of the present disclosure are directed to a gaming system and method providing a multiplay game with resultant symbols. The game is associated with a plurality of reel sets each including a plurality of reels. Each reel is associated with one or more symbol display areas. For each reel set, each symbol display area associated with a reel of that reel set is associated with a symbol display area associated with one of the reels of each other reel set. The gaming system independently generates and displays certain of the symbols on the reels of the respective reel sets at the corresponding symbol display areas. If associated symbol display areas display symbols having a designated relationship with one another, the gaming system forms a resultant symbol from those symbols. The gaming system determines any awards based on the resultant symbols and not based on any non-resultant symbols.

29 Claims, 24 Drawing Sheets

Related U.S. Application Data continuation of application No. 14/141,139, filed on Dec. 26, 2013, now Pat. No. 9,111,420, which is a continuation of application No. 13/626,387, filed on Sep. 25, 2012, now Pat. No. 8,622,809.

(56) References Cited

U.S. PATENT DOCUMENTS

| | | | |
|---|---|---|---|
| 5,308,065 | A | 5/1994 | Bridgeman et al. |
| 5,332,219 | A | 7/1994 | Marnell et al. |
| 5,332,228 | A | 7/1994 | Schultz et al. |
| 5,393,057 | A | 2/1995 | Marnell et al. |
| 5,393,061 | A | 2/1995 | Manship et al. |
| 5,395,111 | A | 3/1995 | Inoue |
| 5,423,539 | A | 6/1995 | Nagao |
| 5,431,408 | A | 7/1995 | Adams et al. |
| 5,449,173 | A | 9/1995 | Thomas et al. |
| 5,531,440 | A | 7/1996 | Dabrowski et al. |
| 5,611,535 | A | 3/1997 | Tiberio |
| 5,722,891 | A | 3/1998 | Inoue |
| 5,752,881 | A | 5/1998 | Inoue |
| 5,769,716 | A | 6/1998 | Saffari et al. |
| 5,823,873 | A | 10/1998 | Moody et al. |
| 5,890,962 | A | 4/1999 | Takemoto et al. |
| 5,980,384 | A | 11/1999 | Barrie |
| 5,997,401 | A | 12/1999 | Crawford |
| 6,027,115 | A | 2/2000 | Griswold et al. |
| 6,033,307 | A | 3/2000 | Vancura et al. |
| 6,056,642 | A | 5/2000 | Bennett |
| 6,059,289 | A | 5/2000 | Vancura et al. |
| 6,059,658 | A | 5/2000 | Mangano et al. |
| 6,089,977 | A | 7/2000 | Bennett |
| 6,095,921 | A | 8/2000 | Walker et al. |
| 6,120,031 | A | 9/2000 | Adams et al. |
| 6,120,378 | A | 9/2000 | Moody et al. |
| 6,142,872 | A | 11/2000 | Walker et al. |
| 6,149,521 | A | 11/2000 | Sanduski |
| 6,159,095 | A | 12/2000 | Frohm et al. |
| 6,159,098 | A | 12/2000 | Slomiany et al. |
| 6,165,070 | A | 12/2000 | Nolte et al. |
| 6,190,254 | B1 | 2/2001 | Bennett |
| 6,220,959 | B1 | 4/2001 | Holmes, Jr. et al. |
| 6,251,013 | B1 | 6/2001 | Bennett |
| 6,261,177 | B1 | 7/2001 | Bennett |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,322,078 | B1 | 11/2001 | Adams |
| 6,336,860 | B1 | 1/2002 | Webb |
| 6,358,144 | B1 | 3/2002 | Kadlic et al. |
| 6,364,766 | B1 | 4/2002 | Anderson et al. |
| 6,413,162 | B1 | 7/2002 | Baerlocher et al. |
| 6,416,408 | B2 | 7/2002 | Tracy et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,454,266 | B1 | 9/2002 | Breeding et al. |
| 6,494,454 | B2 | 12/2002 | Adams |
| 6,517,433 | B2 | 2/2003 | Loose et al. |
| 6,551,187 | B1 | 4/2003 | Jaffe |
| 6,554,703 | B1 | 4/2003 | Bussick et al. |
| 6,554,704 | B2 | 4/2003 | Nicastro et al. |
| 6,561,900 | B1 | 5/2003 | Baerlocher et al. |
| 6,561,904 | B2 | 5/2003 | Locke et al. |
| 6,565,433 | B1 | 5/2003 | Baerlocher et al. |
| 6,579,178 | B1 | 6/2003 | Walker et al. |
| 6,604,740 | B1 | 8/2003 | Singer et al. |
| 6,616,142 | B2 | 9/2003 | Adams |
| 6,632,139 | B1 | 10/2003 | Baerlocher |
| 6,644,663 | B2 | 11/2003 | Seelig et al. |
| 6,669,559 | B1 | 12/2003 | Baerlocher et al. |
| 6,715,756 | B2 | 4/2004 | Inoue |
| 6,719,630 | B1 | 4/2004 | Seelig et al. |
| 6,726,563 | B1 | 4/2004 | Baerlocher et al. |
| 6,731,313 | B1 | 5/2004 | Kaminkow |
| 6,749,502 | B2 | 6/2004 | Baerlocher |
| 6,780,109 | B2 | 8/2004 | Kaminkow |
| 6,786,818 | B1 | 9/2004 | Rothschild et al. |
| 6,805,349 | B2 | 10/2004 | Baerlocher et al. |
| 6,805,632 | B2 | 10/2004 | Suda |
| 6,808,454 | B2 | 10/2004 | Gerrard et al. |
| 6,855,054 | B2 | 2/2005 | White et al. |
| 6,866,583 | B2 | 3/2005 | Glavich et al. |
| 6,878,061 | B2 | 4/2005 | Baerlocher et al. |
| 6,905,406 | B2 | 6/2005 | Kaminkow et al. |
| 6,929,952 | B2 | 8/2005 | Baerlocher |
| 6,981,635 | B1 | 1/2006 | Hughs-Baird et al. |
| 7,022,016 | B2 | 4/2006 | Wood et al. |
| 7,059,967 | B2 | 6/2006 | Baerlocher |
| 7,070,502 | B1 | 7/2006 | Bussick et al. |
| 7,137,888 | B2 | 11/2006 | Glavich et al. |
| 7,169,042 | B2 | 1/2007 | Muir et al. |
| 7,223,172 | B2 | 5/2007 | Baerlocher et al. |
| 7,226,359 | B2 | 6/2007 | Bussick et al. |
| 7,258,611 | B2 | 8/2007 | Bigelow, Jr. et al. |
| 7,311,603 | B2 | 12/2007 | Walker et al. |
| 7,371,168 | B2 | 5/2008 | Bilyeu et al. |
| 7,371,172 | B2 | 5/2008 | Inoue |
| 7,381,134 | B2 | 6/2008 | Cuddy et al. |
| 7,402,102 | B2 | 7/2008 | Marks et al. |
| 7,448,948 | B2 | 11/2008 | Hughs-Baird et al. |
| 7,494,412 | B2 | 2/2009 | Baerlocher |
| 7,526,736 | B2 | 4/2009 | Kaminkow et al. |
| 7,591,723 | B2 | 9/2009 | Cregan et al. |
| 7,625,281 | B2 | 12/2009 | Bilyeu et al. |
| 7,666,083 | B2 | 2/2010 | Baerlocher et al. |
| 7,674,173 | B2 | 3/2010 | Bennett |
| 7,717,787 | B2 | 5/2010 | Walker et al. |
| 7,753,773 | B2 | 7/2010 | Baerlocher et al. |
| 7,775,877 | B2 | 8/2010 | Baerlocher et al. |
| 7,785,196 | B2 | 8/2010 | Baerlocher et al. |
| 7,789,751 | B2 | 9/2010 | Glavich et al. |
| 7,857,695 | B2 | 12/2010 | Rodgers et al. |
| 7,874,908 | B2 | 1/2011 | Walker et al. |
| 7,883,406 | B2 | 2/2011 | Vancura |
| 7,892,081 | B2 | 2/2011 | Glavich et al. |
| 7,976,381 | B2 | 7/2011 | Schugar |
| 8,007,357 | B2 | 8/2011 | Cuddy et al. |
| 8,016,289 | B2 | 9/2011 | Walker et al. |
| 8,021,226 | B2 | 9/2011 | Souza et al. |
| 8,172,665 | B2 | 5/2012 | Hoffman et al. |
| 8,840,455 | B2 * | 9/2014 | Osawa ................ G07F 17/3267 463/16 |
| 9,189,927 | B2 | 11/2015 | Cuddy et al. |
| 2002/0094857 | A1 | 7/2002 | Meyer |
| 2002/0123378 | A1 | 9/2002 | Bucknall et al. |
| 2003/0045345 | A1 | 3/2003 | Berman |
| 2003/0045354 | A1 | 3/2003 | Giobbi |
| 2003/0060267 | A1 | 3/2003 | Glavich et al. |
| 2003/0064768 | A1 | 4/2003 | Fier |
| 2003/0125105 | A1 | 7/2003 | Bennett |
| 2003/0203752 | A1 | 10/2003 | Kaminkow et al. |
| 2003/0203753 | A1 | 10/2003 | Muir et al. |
| 2004/0009803 | A1 | 1/2004 | Bennett et al. |
| 2004/0023714 | A1 | 2/2004 | Asdale |
| 2004/0058727 | A1 | 3/2004 | Marks et al. |
| 2004/0171416 | A1 | 9/2004 | Baerlocher et al. |
| 2004/0171420 | A1 | 9/2004 | Baerlocher et al. |
| 2005/0054418 | A1 | 3/2005 | Baerlocher |
| 2005/0059478 | A1 | 3/2005 | Peterson et al. |
| 2005/0227754 | A1 | 10/2005 | Kaminkow et al. |
| 2006/0058097 | A1 | 3/2006 | Berman et al. |
| 2006/0073879 | A1 | 4/2006 | Baerlocher |
| 2007/0281778 | A1 | 12/2007 | Bigelow et al. |
| 2008/0032783 | A1 | 2/2008 | Walker et al. |
| 2008/0113739 | A1 | 5/2008 | Visser et al. |
| 2008/0139294 | A1 | 6/2008 | Inamura |
| 2008/0200237 | A1 | 8/2008 | Cuddy et al. |
| 2008/0214282 | A1 | 9/2008 | Inoue |

(56) References Cited

U.S. PATENT DOCUMENTS

| | | | | |
|---|---|---|---|---|
| 2008/0280673 | A1 | 11/2008 | Marks et al. | |
| 2009/0104963 | A1 | 4/2009 | Burman et al. | |
| 2009/0233693 | A1 | 9/2009 | Gupta | |
| 2010/0004049 | A1* | 1/2010 | Ching | G07F 17/3267 463/20 |
| 2010/0285864 | A1 | 11/2010 | Baerlocher et al. | |
| 2011/0098098 | A1 | 4/2011 | Stewart et al. | |
| 2012/0052936 | A1 | 3/2012 | Schugar | |
| 2012/0309493 | A1 | 12/2012 | Osawa et al. | |
| 2015/0170463 | A1 | 6/2015 | Singer et al. | |
| 2015/0213677 | A1 | 7/2015 | Haykin et al. | |
| 2016/0125687 | A1* | 5/2016 | Berman | G07F 17/34 463/21 |

FOREIGN PATENT DOCUMENTS

| | | |
|---|---|---|
| AU | 199917318 | 9/1999 |
| AU | 722969 | 8/2000 |
| EP | 0 060 019 | 9/1982 |
| EP | 0 410 789 | 1/1991 |
| EP | 0 698 869 | 2/1996 |
| EP | 0 984 408 | 3/2000 |
| EP | 1 039 424 | 9/2000 |
| EP | 1 063 622 | 12/2000 |
| EP | 1 150 261 | 10/2001 |
| EP | 1 197 932 | 4/2002 |
| WO | WO 00/66235 | 11/2000 |

* cited by examiner

GAMING SYSTEM AND METHOD PROVIDING A MULTIPLAY GAME WITH RESULTANT SYMBOLS

PRIORITY CLAIM

This application is a continuation of, and claims priority to and the benefit of, U.S. patent application Ser. No. 14/797,921, which was filed on Jul. 13, 2015, which is a continuation of, and claims priority to and the benefit of, U.S. patent application Ser. No. 14/141,139, which was filed on Dec. 26, 2013, and issued as U.S. Pat. No. 9,111,420 on Aug. 18, 2015, which is a continuation of, and claims priority to and the benefit of, U.S. patent application Ser. No. 13/626,387, which was filed on Sep. 25, 2012, and issued on Jan. 7, 2014 as U.S. Pat. No. 8,622,809, the entire contents of each of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming systems, an amount of a wager placed on a primary game by a player may vary. For instance, a gaming system may enable a player to wager a minimum quantity of credits, such as one credit (e.g., one penny, nickel, dime, quarter, or dollar), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Various known gaming systems enable a player to wager on and play a plurality of primary or base games simultaneously. In many of these known gaming systems, the award for each played primary game is based on the player obtaining a winning symbol or winning symbol combination and on the amount of the wager placed on that primary game. Certain of these known gaming systems enable a player to place multiple wagers on multiple games and simultaneously display multiple plays of these multiple games. More specifically, these gaming systems enable the player to place a wager amount on each of the multiple games and, for each individual game played, the gaming systems determine any awards based on the generated symbol combinations and the wager amount placed for that game.

There is a continuing need to provide new and different gaming systems and methods that incorporate new and different ways of playing multiple games simultaneously, thereby increasing player enjoyment, entertainment, and excitement.

SUMMARY

Various embodiments of the present disclosure are directed to a gaming system and method providing a multiplay game with resultant symbols. In certain embodiments, the multiplay game is associated with a plurality of reel sets each including a plurality of reels. Each reel is associated with, and configured to display symbols at, one or more symbol display areas. For each reel set, each symbol display area associated with a reel of that reel set is associated with a symbol display area associated with one of the reels of each other reel set. The gaming system independently generates and displays certain of the symbols on the reels of the respective reel sets at the corresponding symbol display areas. If the symbols displayed at associated symbol display areas have a designated relationship with one another, the gaming system forms a resultant symbol from those symbols. In various embodiments, the gaming system determines any awards based on the resultant symbols and not based on any non-resultant symbols. In certain embodiments, the gaming system makes additional, separate award determinations for the displayed symbols of the first plurality of symbols and the displayed symbols of the second plurality of symbols.

More specifically, in one embodiment, the multiplay game is associated with a first plurality of symbols, a second plurality of symbols, a first plurality of symbol display areas, and a second plurality of symbol display areas. Each of the first plurality of symbol display areas is associated with a different one of the second plurality of symbol display areas. For a play of the multiplay game, the gaming system generates and displays a plurality of the first plurality of symbols at the first plurality of symbol display areas. The gaming system independently generates and displays a plurality of the second plurality of symbols at the second plurality of symbol display areas. For each of at least one designated one of the first plurality of symbol display areas, if the symbol displayed at that designated one of the first plurality of symbol display areas has a designated relationship with the symbol displayed at the associated one of the second plurality of symbol display areas, the gaming system forms a resultant symbol from those two symbols based on that designated relationship. The gaming system makes an award determination based on any resultant symbols and not based on any non-resultant symbols. In other words, in this embodiment the gaming system considers any resultant symbols but does not consider any symbols that are not resultant symbols when determining any awards. The gaming system provides any determined awards.

In certain embodiments, as noted above, the gaming system also makes a first award determination based on the symbols displayed at the first plurality of symbol display areas and not based on the symbols displayed at the second plurality of symbol display areas or any resultant symbols, and a second award determination based on the symbols displayed at the second plurality of the symbol display areas and not based on the symbols displayed at the first plurality of symbol display areas or any resultant symbols. The gaming system provides any awards determined by these award determinations in addition to any awards determined based on any resultant symbols. That is, in such embodiments, the gaming system makes separate, distinct award determinations for each of: (a) the displayed symbols of the first plurality of symbols, (b) the displayed symbols of the second plurality of symbols, and (c) any resultant symbols.

In other embodiments, each of the first plurality of symbol display areas is a designated symbol display area. Accordingly, for each of the first plurality of symbol display areas in these embodiments, if the symbol displayed at that symbol display area has a designated relationship with the symbol displayed at the associated one of the second plurality of symbol display areas, the gaming system forms a resultant symbol from those two symbols based on that designated relationship.

It should thus be appreciated that the gaming system and method of the present disclosure incorporate new and different ways to play multiple games simultaneously, thereby increasing player enjoyment, entertainment, and excitement.

Additional features and advantages are described herein, and will be apparent from, the following Detailed Description and the Figures.

DETAILED DESCRIPTION

Multiplay Game with Resultant Symbols

Various embodiments of the present disclosure are directed to a gaming system and method providing a multiplay game with resultant symbols. While the embodiments described below are directed to a primary wagering game, it should be appreciated that the present disclosure may additionally or alternatively be employed as or in association with a bonus or a secondary game. Moreover, while the player's credit balance, the player's wager, and any awards are displayed as an amount of monetary credits or currency in the embodiments described below, one or more of the player's credit balance, the player's wager, and any awards provided to the player may be for non-monetary points or credits, promotional points or credits, and/or player tracking points or credits.

Figure 1:
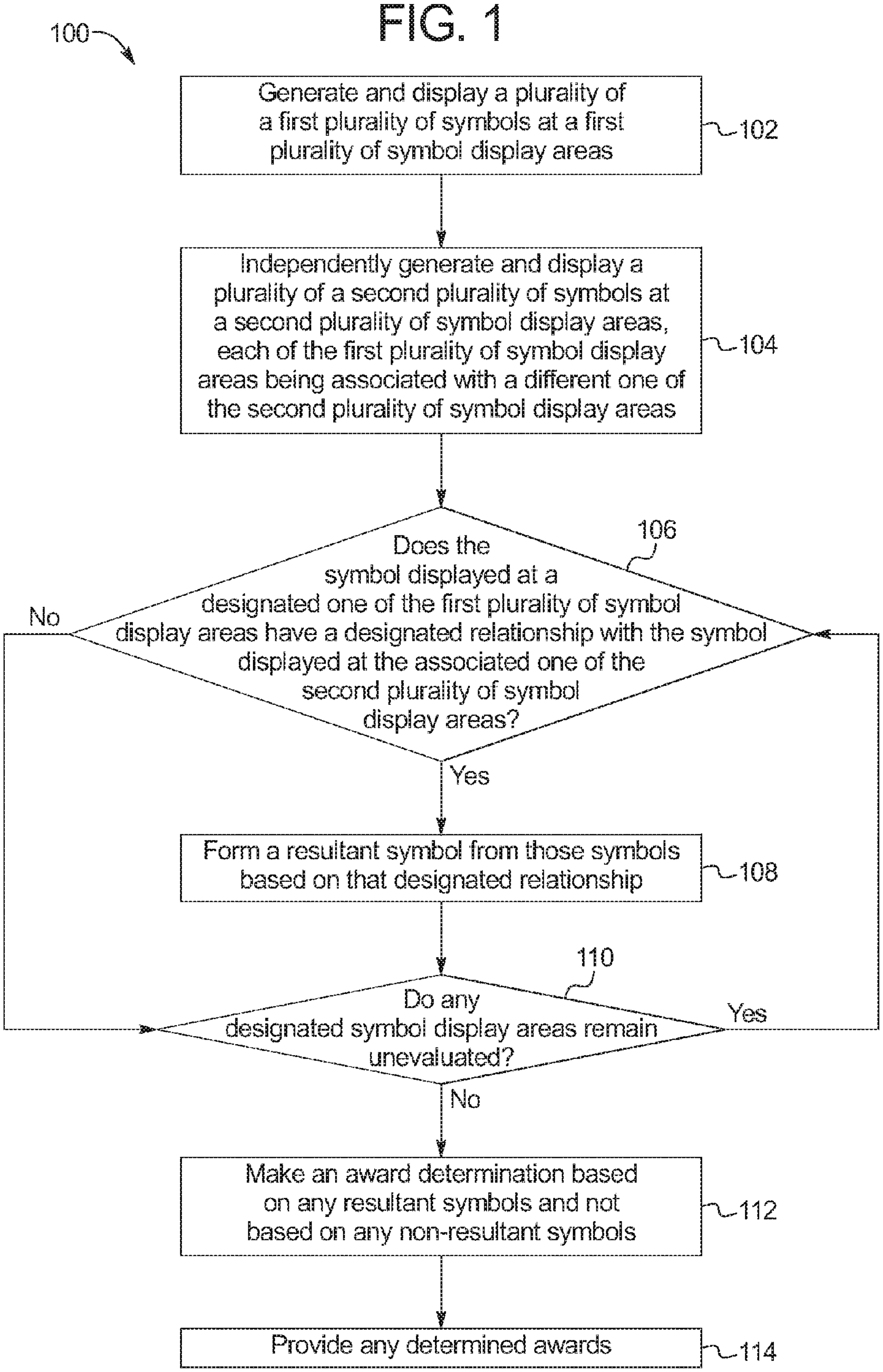
FIG. 1 is a flowchart illustrating a method of operating an example embodiment of the gaming system of the present disclosure.

FIG. 1 illustrates a flowchart of an example process or method 100 for operating an embodiment of the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a multiplay game associated with a first plurality of symbols and a second plurality of symbols. The gaming system is associated with a first plurality of symbol display areas and a second plurality of symbol display areas. Each of the first plurality of symbol display areas is associated with a different one of the second plurality of symbol display areas. A plurality of the first plurality of symbol display areas are designated symbol display areas. In operation of this example, for a play of the multiplay game, the gaming system generates and displays a plurality of the first plurality of symbols at the first plurality of symbol display areas, as indicated by block 102. The gaming system independently generates and displays a plurality of the second plurality of symbols at the second plurality of symbol display areas, as indicated by block 104. The gaming system determines whether the symbol displayed at one of the designated symbol display areas (of the first plurality of symbol display areas) has a designated relationship with the symbol displayed at the associated one of the second plurality of symbol display areas, as indicated by diamond 106.

If the gaming system determines that the symbol displayed at that designated symbol display area does not have the designated relationship with the symbol displayed at the associated one of the second plurality of symbol display areas, process 100 proceeds to diamond 110, explained below. If, on the other hand, the gaming system determines that the symbol displayed at that designated symbol display area has the designated relationship with the symbol displayed at the associated one of the second plurality of symbol display areas, the gaming system forms a resultant symbol from those symbols based on that designated relationship, as indicated by block 108. The gaming system determines whether any designated symbol display areas remain unevaluated, as indicated by diamond 110. If the gaming system determines that at least one designated symbol display area remains unevaluated, process 100 returns to diamond 106 and repeats diamond 106 and block 108 (if necessary) for one of the unevaluated designated symbol display areas.

If the gaming system instead determines that no unevaluated designated symbol display areas remain, the gaming system makes an award determination based on any resultant symbols and not based on any non-resultant symbols, as indicated by block 112. That is, the gaming system considers any resultant symbols but does not consider any symbols that are not resultant symbols when determining any awards. The gaming system provides any determined awards, as indicated by block 114.

In certain embodiments, when two symbols that have a designated relationship with one another are displayed at associated symbol display areas, the gaming system produces a resultant symbol in the form of another symbol from those two symbols that replaces those two symbols. In one such embodiment, the resultant symbol is visually related to the two related symbols. For instance, the two related symbols are opposite halves of a single resultant symbol, such as a resultant JACKPOT symbol, a resultant WILD symbol, or a resultant BONUS symbol, and when those two related symbols are displayed at associated symbol display areas, the gaming system replaces the two halves of the respective resultant symbol with the resultant symbol. In another such embodiment, the resultant symbol is not visually related to the two related symbols. For instance, the two related symbols are CHERRY symbols, and when those two related symbols are displayed at associated symbol display areas, the gaming system replaces those two CHERRY symbols with a BONUS symbol (or any other suitable visually unrelated symbol).

Figure 2A:
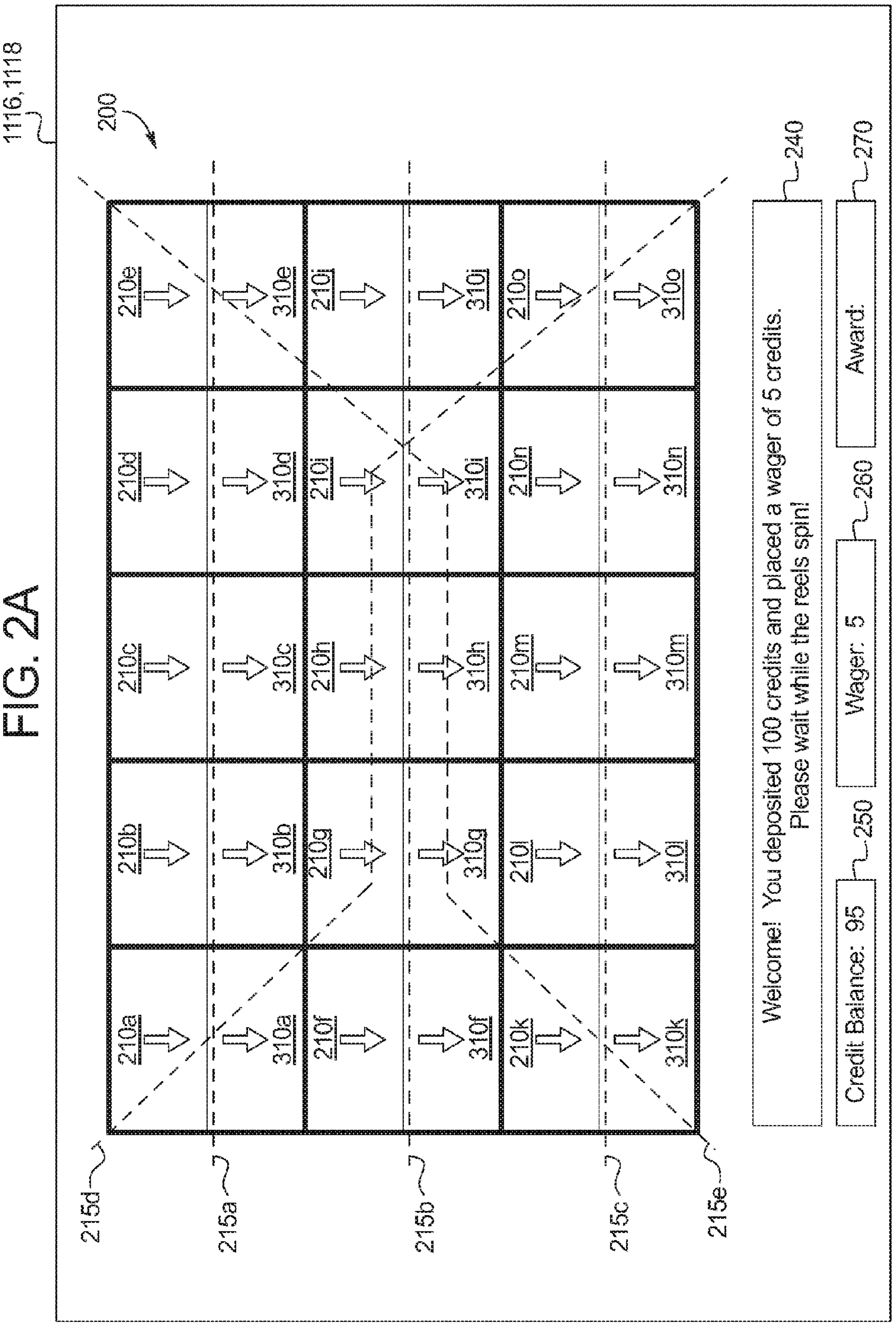
FIGS. 2A, 2B, and 2C illustrate screen shots of an example embodiment of the gaming system of the present disclosure configured to operate an example of the multiplay game of the present disclosure.
Figure 2B:
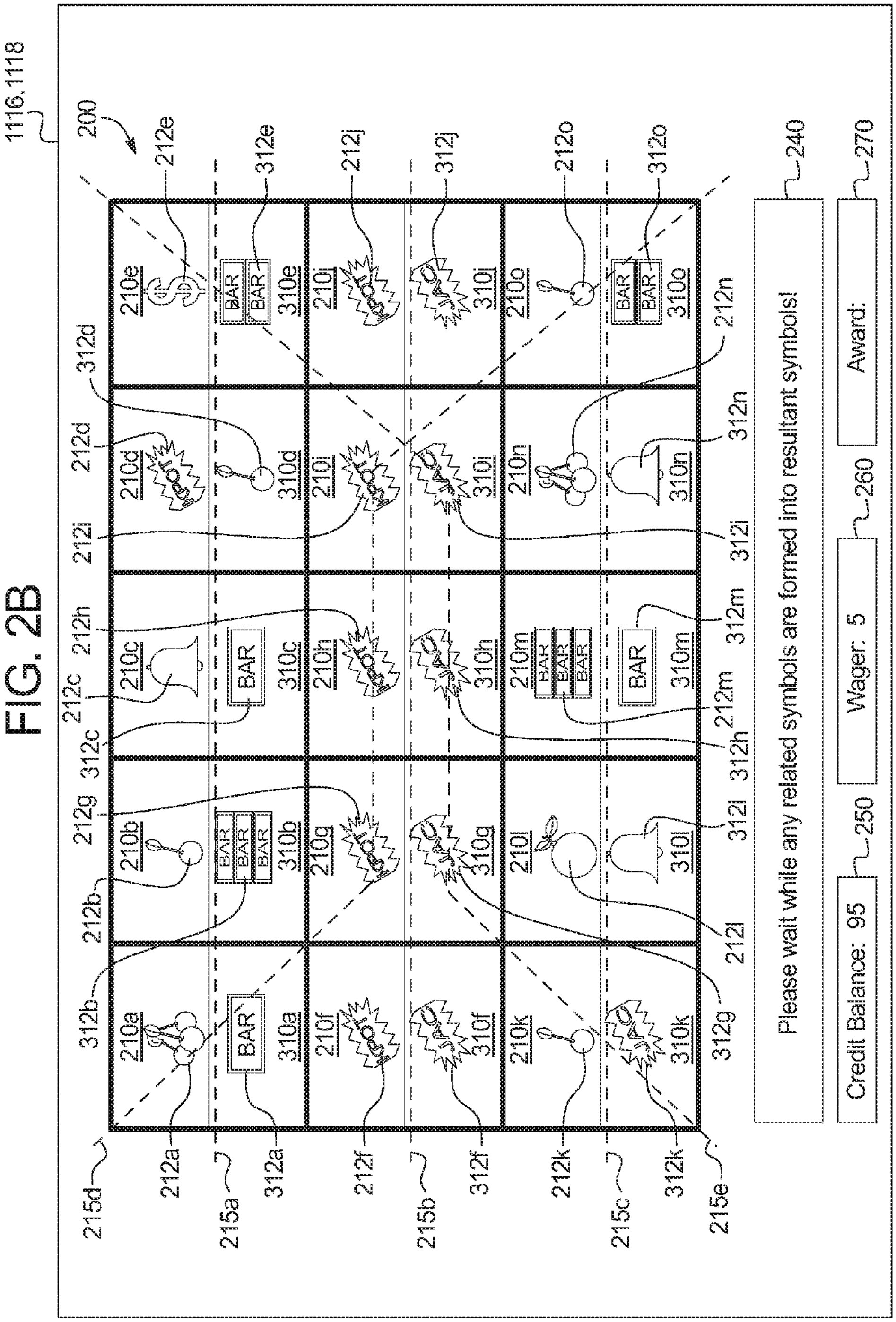
Figure 2C:
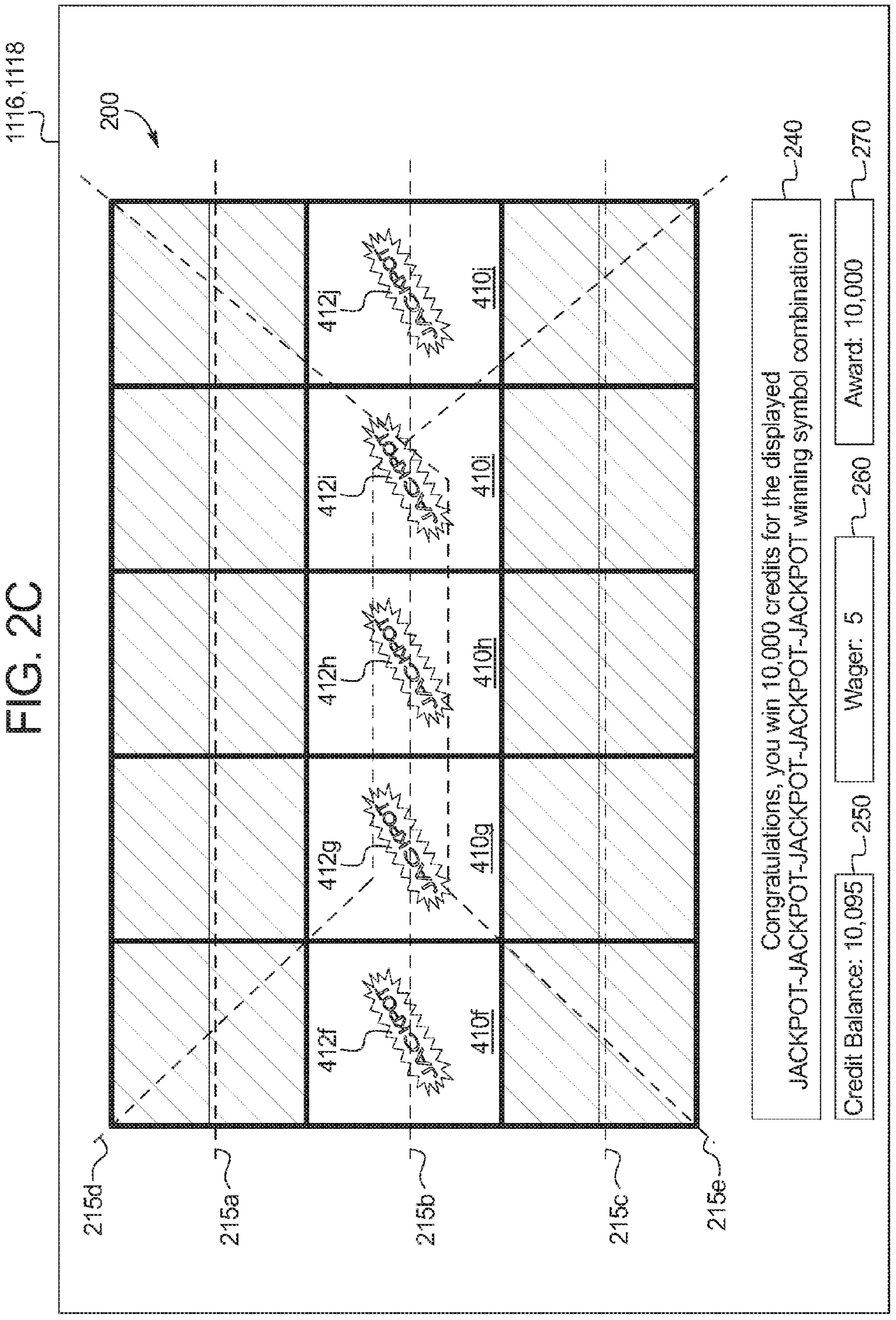

FIGS. 2A, 2B, and 2C illustrate screen shots of an example of one such embodiment. In this example, the gaming system displays (such as on a display device 1116 or 1118, described below) a matrix 200 including fifteen matrix positions arranged in a 3×5 configuration. The gaming system displays a first plurality of symbol display areas 210*a*, 210*b*, 210*c*, 210*d*, 210*e*, 210*f*, 210*g*, 210*h*, 210*i*, 210*j*, 210*k*, 2101, 210*m*, 210*n*, and 210*o* in the upper halves of the respective matrix positions of matrix 200 and a second plurality of symbol display areas 310*a*, 310*b*, 310*c*, 310*d*, 310*e*, 310*f*, 310*g*, 310*h*, 310*i*, 310*j*, 310*k*, 3101, 310*m*, 310*n*, and 310*o* in the lower halves of the respective matrix positions of matrix 200. For instance, in the uppermost and leftmost matrix position of matrix 200, the gaming system displays symbol display area 210*a* in the upper half of that matrix position and adjacently displays symbol display area 310*a* in the lower half of that matrix position.

Each of the first plurality of symbol display areas is associated with a different one of the second plurality of symbol display areas. Specifically, in this example, the symbol display areas of the first and second pluralities of symbol display areas that are displayed in a same one of the matrix positions are associated with one another. That is, symbol display areas 210*a* and 310*a* are associated with one another, symbol display areas 210*b* and 310*b* are associated with one another, symbol display areas 210*c* and 310*c* are associated with one another, symbol display areas 210*d* and 310*d* are associated with one another, symbol display areas 210*e* and 310*e* are associated with one another, symbol display areas 210*f* and 310*f* are associated with one another, symbol display areas 210*g* and 310*g* are associated with one another, symbol display areas 210*h* and 310*h* are associated with one another, symbol display areas 210*i* and 310*i* are associated with one another, symbol display areas 210*j* and 310*j* are associated with one another, symbol display areas 210*k* and 310*k* are associated with one another, symbol display areas 210*l* and 310*l* are associated with one another, symbol display areas 210*m* and 310*m* are associated with one another, symbol display areas 210*n* and 310*n* are associated with one another, and symbol display areas 210*o* and 310*o* are associated with one another.

It should thus be appreciated that, in this example, associated symbol display areas are displayed adjacent to one another in a single matrix position. While the associated symbol display areas occupy the upper and lower halves of their respective matrix positions in this example, it should be appreciated that the associated symbol display areas may occupy any suitable portions of their respective matrix positions, such as left and right portions.

It should also be appreciated that a given symbol display area of the first plurality of symbol display areas may be associated with any suitable symbol display area of the second plurality of symbol display areas. For instance, in another embodiment, symbol display area 210*a* is associated with symbol display area 310*o*.

Each of the first plurality of symbol display areas is configured to display one of a first plurality of symbols and each of the second plurality of symbol display areas is configured to display one of a second plurality of symbols. In this example, the first plurality of symbols and the second plurality of symbols are different. More specifically, the first plurality of symbols includes an UPPER HALF JACKPOT symbol and not a LOWER HALF JACKPOT symbol and the second plurality of symbols includes the LOWER HALF JACKPOT symbol and not the UPPER HALF JACKPOT symbol. The UPPER HALF JACKPOT symbol and the LOWER HALF JACKPOT symbol have a designated relationship with one another. When the UPPER HALF JACKPOT symbol is displayed at one of the first plurality of symbol display areas and the LOWER HALF JACKPOT symbol is displayed at the associated one of the second plurality of symbol display areas, the gaming system forms a resultant JACKPOT symbol from those two symbols. The resultant JACKPOT symbol is, in this example, not otherwise obtainable (though in certain embodiments the resultant symbol is otherwise obtainable). That is, neither the first plurality of symbols nor the second plurality of symbols includes the JACKPOT symbol. In this example, none of the other symbols have a designated relationship with one another. It should thus be appreciated that, in this example, when two symbols that have the designated relationship with one another are displayed at associated symbol display areas, the gaming system produces another symbol from those two symbols that replaces those two symbols.

The gaming system displays a plurality of paylines for the multiplay game. Each of the paylines is associated with a different plurality of the symbol display areas. Specifically, in this example, payline A 215*a* is associated with symbol display areas 210*a*, 210*b*, 210*c*, 210*d*, 210*e*, 310*a*, 310*b*, 310*c*, 310*d*, and 310*e*; payline B 215*b* is associated with symbol display areas 210*f*, 210*g*, 210*h*, 210*i*, and 210*j*, 310*f*, 310*g*, 310*h*, 310*i*, and 310*j*; payline C 215*c* is associated with symbol display areas 210*k*, 2101, 210*m*, 210*n*, 210*o*, 310*k*, 3101, 310*m*, 310*n*, and 310*o*; payline D 215*d* is associated with symbol display areas 210*a*, 210*g*, 210*h*, 210*i*, 210*o*, 310*a*, 310*g*, 310*h*, 310*i*, and 310*o*; and payline E 215*e* is associated with symbol display areas 210*k*, 210*g*, 210*h*, 210*i*, 210*e*, 310*k*, 310*g*, 310*h*, 310*i*, and 310*e*. Payline A 215*a*, payline B 215*b*, payline C 215*c*, payline D 215*d*, and payline E 215*e* are sometimes referred to herein as paylines A, B, C, D, and E for brevity.

The gaming system also displays: a message display 240, which displays information, notifications, and/or messages before, during, or after play of the multiplay game; a credit meter 250, which displays a player's credit balance in the form of an amount of credits in this example; a wager indicator 260, which displays the player's wager for a play of the multiplay game in the form of an amount of credits in this example; and an award meter 270, which displays any awards provided to the player in the form of an amount of credits in this example. While in this illustrated example the gaming system indicates the player's credit balance, the player's wager, and any awards provided to the player in the form of amounts of credits, it should be appreciated that such indications may alternatively or additionally be made in the form of amounts of currency.

Turning to FIG. 2A, in this example, a player funds the gaming system by depositing value. The gaming system provides the player with 100 credits, which represent the deposited value. The player subsequently places a wager of 5 credits. Wager indicator 260 displays the player's wager of 5 credits. Credit meter 250 displays the player's total remaining credit balance of 95 credits (i.e., the player's initial credit balance of 100 credits minus the player's wager of 5 credits). Message display 240 displays the following message: "WELCOME! YOU DEPOSITED 100 CREDITS AND PLACED A WAGER OF 5 CREDITS. PLEASE WAIT WHILE THE REELS SPIN!"

As illustrated in FIG. 2B, upon initiation of a play of the multiplay game, the gaming system generates and displays a plurality of the first plurality of symbols at the first plurality of symbol display areas and independently generates and displays a plurality of the second plurality of symbols at the second plurality of symbol display areas. Specifically, in this illustrated example, the gaming system generates and displays, in pertinent part: UPPER HALF JACKPOT symbol 212*f* at symbol display area 210*f*, LOWER HALF JACKPOT symbol 312*f* at symbol display area 310*f*, UPPER HALF JACKPOT symbol 212*g* at symbol display area 210*g*, LOWER HALF JACKPOT symbol 312*g* at symbol display area 310*g*, UPPER HALF JACKPOT symbol 212*h* at symbol display area 210*h*, LOWER HALF JACKPOT symbol 312*h* at symbol display area 310*h*, UPPER HALF JACKPOT symbol 212*i* at symbol display area 210*i*, LOWER HALF JACKPOT symbol 312*i* as symbol display area 310*i*, UPPER HALF JACKPOT symbol 212*j* at symbol display area 210*j*, and LOWER HALF JACKPOT symbol 312*j* at symbol display area 310*j*.

In this example, each of the first plurality of symbol display areas is a designated symbol display area. Accordingly, after generating and displaying the symbols of the first and second pluralities of symbols at the first and second pluralities of symbol display areas, the gaming system determines, for each of the first plurality of symbol display areas (i.e., for each of the designated symbol display areas), whether the symbol displayed at that symbol display area has the designated relationship with the symbol displayed at the associated one of the second plurality of symbol display areas. Message display 240 displays the following message: "PLEASE WAIT WHILE ANY RELATED SYMBOLS ARE FORMED INTO RESULTANT SYMBOLS!"

As explained above, in this example, only the UPPER HALF JACKPOT symbol and the LOWER HALF JACKPOT symbol have the designated relationship with one another. Here, the gaming system determines that: UPPER HALF JACKPOT symbol 212*f* and LOWER HALF JACKPOT symbol 312*f*, respectively displayed at associated symbol display areas 210*f* and 310*f*, have the designated relationship with one another; UPPER HALF JACKPOT symbol 212*g* and LOWER HALF JACKPOT symbol 312*g*, respectively displayed at associated symbol display areas 210*g* and 310*g*, have the designated relationship with one another; UPPER HALF JACKPOT symbol 212*h* and LOWER HALF JACKPOT symbol 312*h*, respectively displayed at associated symbol display areas 210*h* and 310*h*, have the designated relationship with one another; UPPER HALF JACKPOT symbol 212*i* and LOWER HALF JACKPOT symbol 312*i*, respectively displayed at associated symbol display areas 210*i* and 310*i*, have the designated relationship with one another; and UPPER HALF JACKPOT symbol 212*j* and LOWER HALF JACKPOT symbol 312*j*, respectively displayed at associated symbol display areas 210*j* and 310*j*, have the designated relationship with one another.

Accordingly, as shown in FIG. 2C, the gaming system forms a resultant JACKPOT symbol from each of those sets of two related symbols. Specifically, the gaming system forms resultant JACKPOT symbol 412*f* from symbols 212*f* and 312*f*, resultant JACKPOT symbol 412*g* from symbols 212*g* and 312*g*, resultant JACKPOT symbol 412*h* from symbols 212*h* and 312*h*, resultant JACKPOT symbol 412*i* from symbols 212*i* and 312*i*, and resultant JACKPOT symbol 412*j* from symbols 212*j* and 312*j*. The gaming system displays resultant symbol 412*f* at resultant symbol display area 410*f* (which replaces symbol display areas 210*f* and 3100, resultant symbol 412*g* at resultant symbol display area 410*g* (which replaces symbol display areas 210*g* and 310*g*), resultant symbol 412*h* at resultant symbol display area 410*h* (which replaces symbol display areas 210*h* and 310*h*), resultant symbol 412*i* at resultant symbol display area 410*i* (which replaces symbol display areas 210*i* and 310*i*), and resultant symbol 412*j* at resultant symbol display area 410*j* (which replaces symbol display areas 210*j* and 310*j*).

In this illustrated example, since none of the symbols displayed at any other associated symbol display areas have the designated relationship with one another, the gaming system "grays out," "crosses out," or otherwise indicates that those symbol display areas do not display symbols that have the designated relationship with one another. It should be appreciated that, in other embodiments, the gaming system does not do so.

In this illustrated example, the gaming system makes an award determination based on the resultant symbols and not based on any of the other, non-resultant symbols. Here, the gaming system determines whether the resultant symbols form any of a plurality of winning symbol combinations along paylines A, B, C, D, and/or E. In this example, the gaming system determines an award of 10,000 credits for resultant JACKPOT symbols 412*f*, 412*g*, 412*h*, 412*i*, and 412*j* displayed from left to right at resultant symbol display areas 410*f*, 410*g*, 410*h*, 410*i*, and 410*j*, respectively, along payline B. That is, the gaming system determines a 10,000 credit award for the five instances of the JACKPOT symbol displayed along payline B. The gaming system displays the 10,000 credit award in award indicator 270 and updates the player's credit balance indicated by credit meter 250 to 10,095 credits to reflect the 10,000 credit award. Message display 240 displays the following message: "CONGRATULATIONS, YOU WIN 10,000 CREDITS FOR THE DISPLAYED JACKPOT-JACKPOT-JACKPOT-JACKPOT-JACKPOT WINNING SYMBOL COMBINATION!"

In other embodiments, when two symbols that have a designated relationship with one another are displayed at associated symbol display areas, the gaming system produces a resultant symbol in the form of a higher multiplicity symbol from those two symbols that replaces those two symbols. In one such embodiment, the resultant symbol is a double symbol including two instances of one of the symbols of the first or second pluralities of symbols. For instance, the two related symbols are identical symbols (e.g., two CHERRY symbols), and when those related symbols are displayed at associated symbol display areas, the gaming system replaces those two symbols with a resultant symbol including two instances of that symbol (i.e., a CHERRY-CHERRY symbol in this example).

Figure 3A:
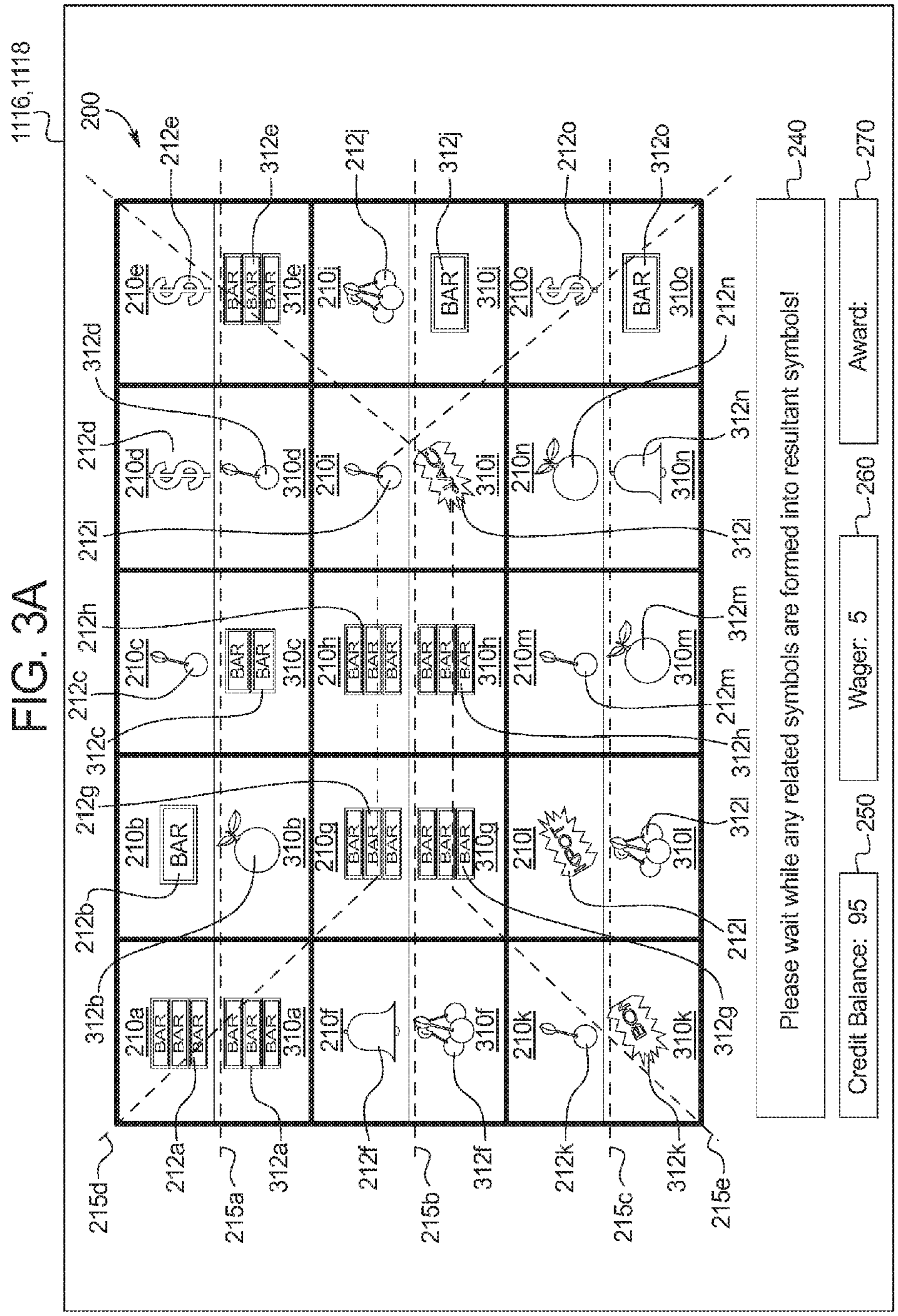
FIGS. 3A and 3B illustrate screen shots of another example embodiment of the gaming system of the present disclosure configured to operate another example of the multiplay game of the present disclosure.
Figure 3B:
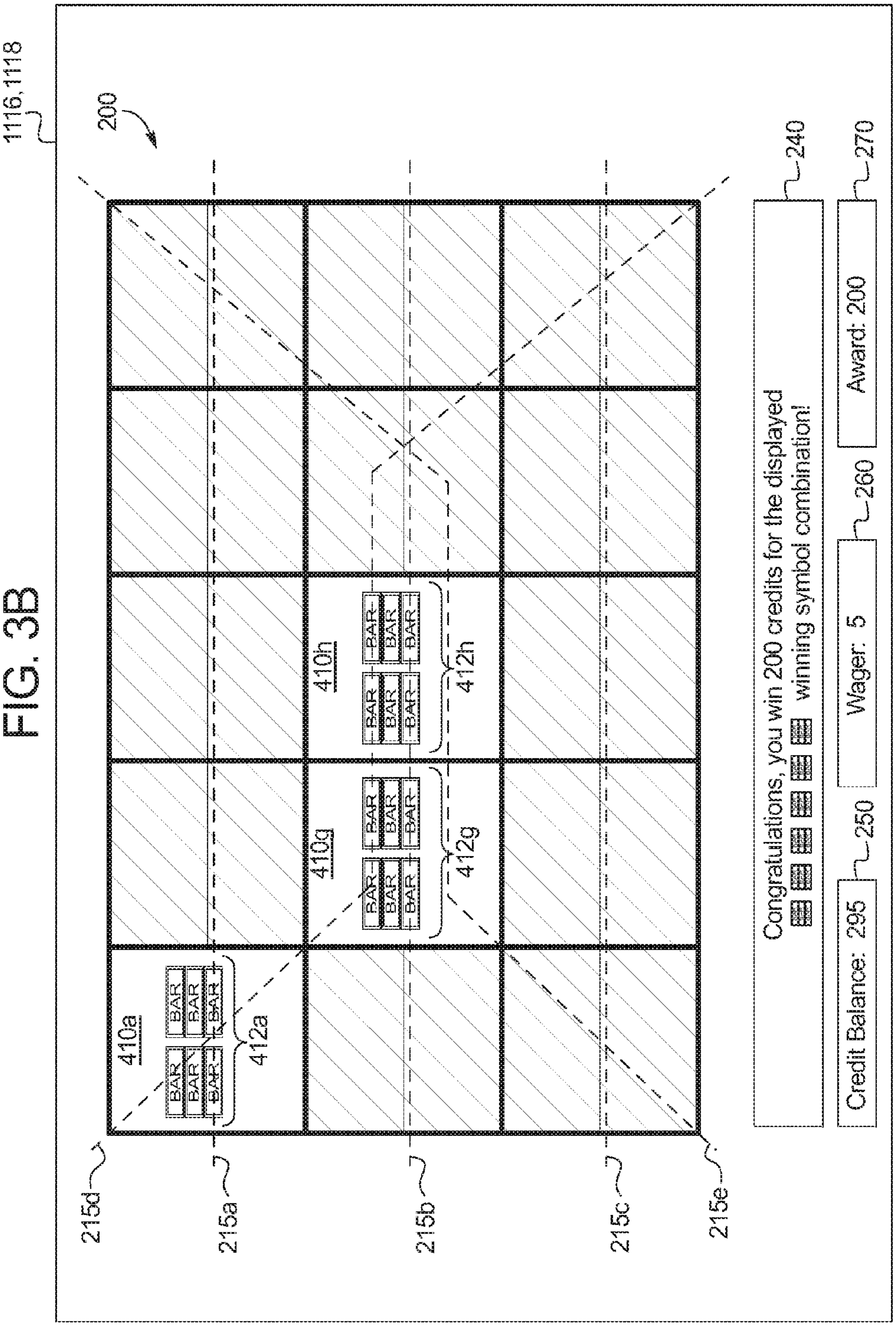

FIGS. 3A and 3B illustrate screen shots of an example of one such embodiment. In this example, the first plurality of symbols and the second plurality of symbols are the same. The symbols of the first plurality of symbols and the second plurality of symbols that are identical have a designated relationship with one another. For instance, the CHERRY symbol of the first plurality of symbols and the CHERRY symbol of the second (identical) plurality of symbols have the designated relationship with one another. When two symbols displayed at associated symbol display areas have the designated relationship with one another, the gaming system forms a resultant double symbol including two instances of that symbol. For instance, if the CHERRY symbol is displayed at two associated symbol display areas, the gaming system forms a resultant CHERRY-CHERRY symbol from those two CHERRY symbols. It should thus be appreciated that, in this example, when two symbols that have the designated relationship with one another are displayed at associated symbol display areas, the gaming system produces a higher multiplicity symbol (a double symbol in this example) to replace those two symbols.

Although not displayed, in this example, a player funds the gaming system by depositing value. The gaming system provides the player with 100 credits, which represent the deposited value. The player subsequently places a wager of 5 credits. As illustrated in FIG. 3A, upon initiation of a play of the multiplay game, the gaming system generates and displays a plurality of the first plurality of symbols at the first plurality of symbol display areas and independently generates and displays a plurality of the second plurality of symbols at the second plurality of symbol display areas. Specifically, in this illustrated example, the gaming system generates and displays, in pertinent part: TRIPLE BAR symbol 212*a* at symbol display area 210*a*, TRIPLE BAR symbol 312*a* at symbol display area 310*a*, TRIPLE BAR symbol 212*g* at symbol display area 210*g*, TRIPLE BAR symbol 312*g* at symbol display area 310*g*, TRIPLE BAR symbol 212*h* at symbol display area 210*h*, and TRIPLE BAR symbol 312*h* at symbol display area 310*h*.

In this example, each of the first plurality of symbol display areas is a designated symbol display area. Accordingly, after generating and displaying the symbols of the first and second pluralities of symbols at the first and second pluralities of symbol display areas, the gaming system determines, for each of the first plurality of symbol display areas (i.e., for each of the designated symbol display areas), whether the symbol displayed at that symbol display area has the designated relationship with the symbol displayed at the associated one of the second plurality of symbol display areas. Message display 240 displays the following message: "PLEASE WAIT WHILE ANY RELATED SYMBOLS ARE FORMED INTO RESULTANT SYMBOLS!"

As explained above, in this example, when associated symbol display areas each display the same symbol, the gaming system determines that those symbols have the designated relationship with one another. Here, the gaming system determines that: TRIPLE BAR symbol 212*a* and TRIPLE BAR symbol 312*a*, respectively displayed at associated symbol display areas 210*a* and 310*a*, have the designated relationship with one another; TRIPLE BAR symbol 212*g* and TRIPLE BAR symbol 312*g*, respectively displayed at associated symbol display areas 210*g* and 310*g*, have the designated relationship with one another; and TRIPLE BAR symbol 212*h* and TRIPLE BAR symbol 312*h*, respectively displayed at associated symbol display areas 210*h* and 310*h*, have the designated relationship with one another.

Accordingly, as shown in FIG. 3B, the gaming system forms a resultant double symbol from each of those sets of two related symbols. Specifically, the gaming system forms resultant TRIPLE BAR-TRIPLE BAR symbol 412 from symbols 212*a* and 312*a*, resultant TRIPLE BAR-TRIPLE BAR symbol 412*g* from symbols 212*g* and 312*g*, and resultant TRIPLE BAR-TRIPLE BAR symbol 412*h* from symbols 212*h* and 312*h*. The gaming system displays resultant double symbol 412*a* at resultant symbol display area 410*a* (which replaces symbol display areas 210*a* and 310*a*), resultant double symbol 412*g* at resultant symbol display area 410*g* (which replaces symbol display areas 210*g* and 310*g*), and resultant double symbol 412*h* at resultant symbol display area 410*h* (which replaces symbol display areas 210*h* and 310*h*). In this illustrated example, since none of the symbols displayed at any other associated symbol display areas have the designated relationship with one another, the gaming system "grays out," "crosses out," or otherwise indicates that those symbol display areas do not display symbols that have the designated relationship with one another.

In this illustrated example, the gaming system makes an award determination based on the resultant symbols and not based on any of the other, non-resultant symbols. Here, the gaming system determines whether the resultant symbols form any of a plurality of winning symbol combinations along paylines A, B, C, D, and/or E. In this example, the gaming system determines an award of 200 credits for resultant TRIPLE BAR symbols 412*a*, 412*g*, and 412*h* displayed from left to right at resultant symbol display areas 410*a*, 410*g*, and 410*h*, respectively, along payline D. That is, the gaming system determines a 200 credit award for the six instances of the TRIPLE BAR symbol displayed along payline D. The gaming system displays the 200 credit award in award indicator 270 and updates the player's credit balance indicated by credit meter 250 to 295 credits to reflect the 200 credit award. Message display 240 displays the following message: "CONGRATULATIONS, YOU WIN 200 CREDITS FOR THE DISPLAYED TRIPLE BAR- TRIPLE BAR-TRIPLE BAR-TRIPLE BAR-TRIPLE BAR-TRIPLE BAR WINNING SYMBOL COMBINATION!"

In further embodiments, when two symbols that have a designated relationship with one another are displayed at associated symbol display areas, the gaming system produces a resultant symbol in the form of an enhanced version of one of those symbols from those two symbols that replaces those two symbols. In one such embodiment, the resultant symbol includes one of the two related symbols and a modifier (such as a multiplier). In this embodiment, the gaming system uses the modifier to modify any awards won by the player for the play of the multiplay game. In other embodiments, the resultant symbol only includes a modifier. In further embodiments, the resultant symbol includes a modifier and at least one different symbol.

Additionally, in certain embodiments, the multiplay game is associated with a plurality of different types of designated relationships that symbols may have with one another. Each different type of designated relationship is associated with a different type of resultant symbol formed when two symbols displayed at associated symbol display areas have that designated relationship.

Figure 4A:
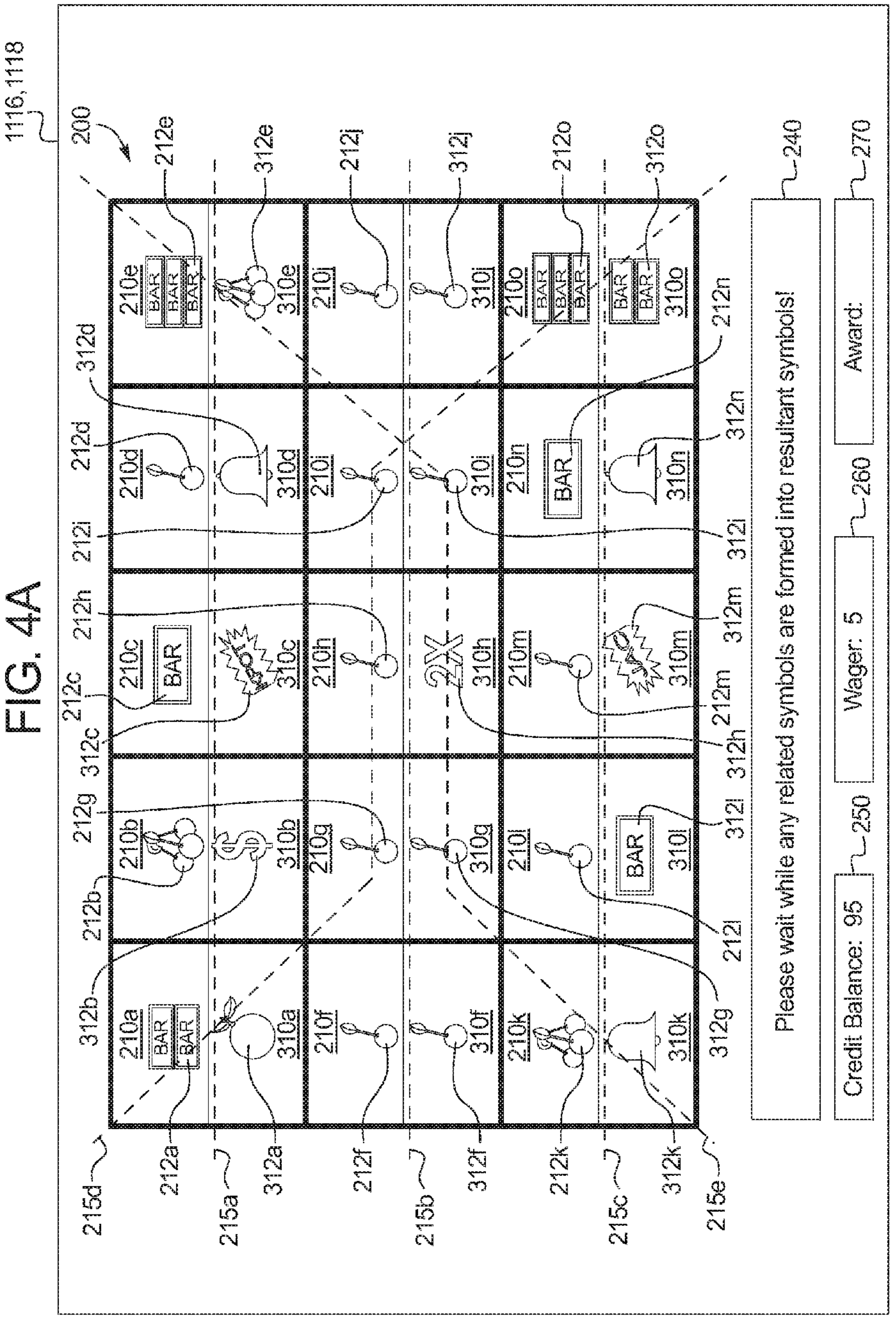
FIGS. 4A and 4B illustrate screen shots of another example embodiment of the gaming system of the present disclosure configured to operate another example of the multiplay game of the present disclosure.
Figure 4B:
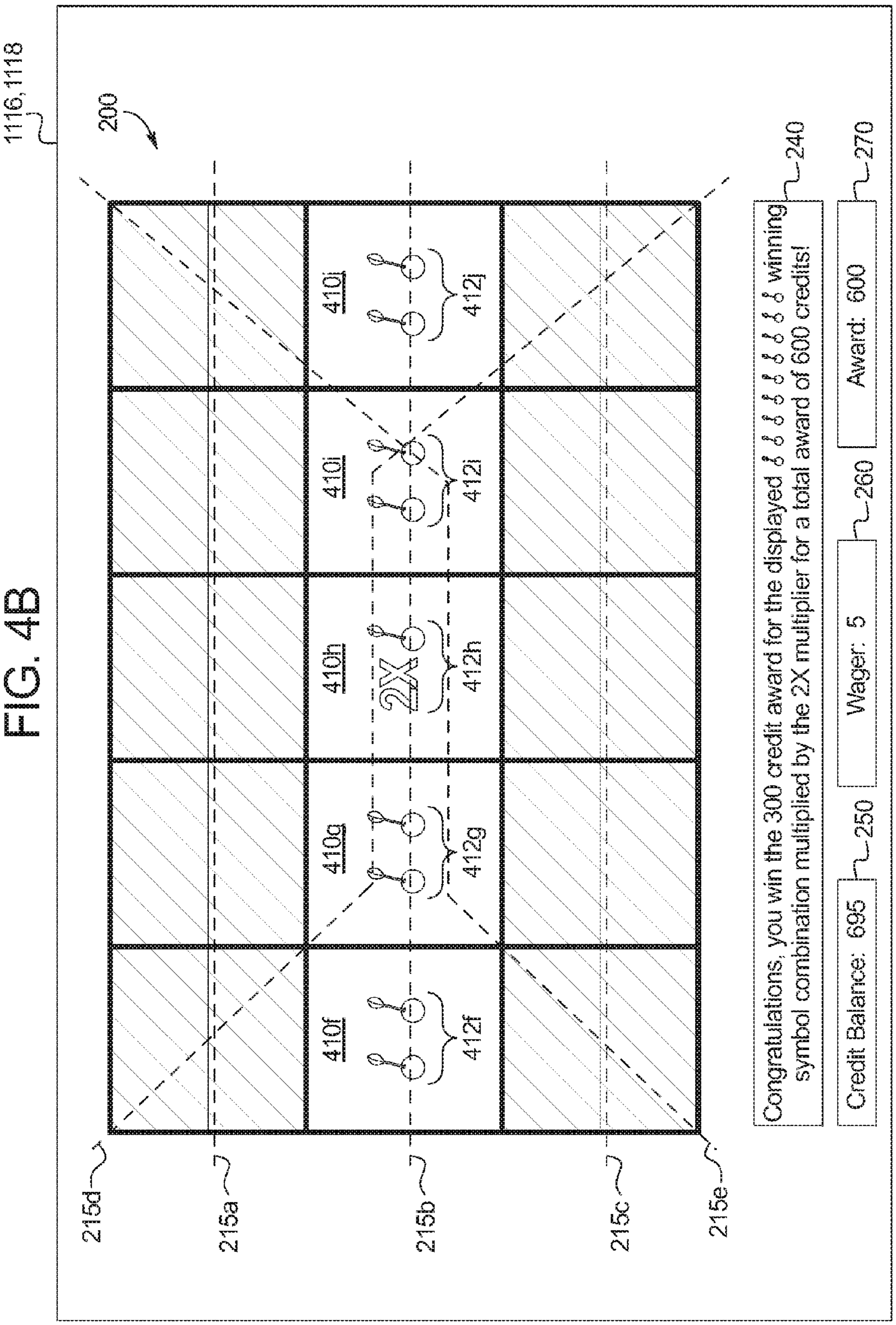

FIGS. 4A and 4B illustrate screen shots of an example of one such embodiment. In this example, the first plurality of symbols and the second plurality of symbols each include a plurality of identical symbols. For instance, the first plurality of symbols and second plurality of symbols each include a CHERRY symbol and a TRIPLE BAR symbol. Additionally, the first plurality of symbols and the second plurality of symbols each include at least one multiplier symbol, such as a 2× symbol, a 3× symbol, and a 4× symbol.

In this example, the symbols of the first plurality of symbols and the second plurality of symbols that are identical have a first designated relationship with one another. For instance, the CHERRY symbol of the first plurality of symbols and the CHERRY symbol of the second plurality of symbols have the first designated relationship with one another. When two symbols displayed at associated symbol display areas have the first designated relationship with one another, the gaming system forms a resultant double symbol including two instances of that symbol. For instance, if the CHERRY symbol is displayed at two associated symbol display areas, the gaming system forms a resultant CHERRY-CHERRY symbol from those two CHERRY symbols. It should thus be appreciated that, in this example, when two symbols that have the first designated relationship with one another are displayed at associated symbol display areas, the gaming system produces a higher multiplicity symbol (a double symbol in this example) to replace those two symbols.

Additionally, in this example, each of the non-multiplier symbols of the first plurality of symbols and the second plurality of symbols has a second designated relationship with each of the multiplier symbols. For instance, the CHERRY symbol of the first plurality of symbols and the 2× multiplier symbol of the second plurality of symbols have the second designated relationship with one another, and the 4× multiplier symbol of the first plurality of symbols and the TRIPLE BAR symbol of the second plurality of symbols have the second designated relationship with one another. In this example, when two symbols have the second designated relationship with one another, the gaming system forms a resultant symbol including the non-multiplier symbol and the multiplier represented by the multiplier symbol. The gaming system employs the multiplier to modify any award associated with that resultant symbol for the play of the multiplay game.

Although not displayed, in this example, a player funds the gaming system by depositing value. The gaming system provides the player with 100 credits, which represent the deposited value. The player subsequently places a wager of 5 credits. As illustrated in FIG. 4A, upon initiation of a play of the multiplay game, the gaming system generates and displays a plurality of the first plurality of symbols at the first plurality of symbol display areas and independently generates and displays a plurality of the second plurality of symbols at the second plurality of symbol display areas. Specifically, in this illustrated example, the gaming system generates and displays, in pertinent part: CHERRY symbol 212*f* at symbol display area 210*f*, CHERRY symbol 312*f* at symbol display area 310*f*, CHERRY symbol 212*g* at symbol display area 210*g*, CHERRY symbol 312*g* at symbol display area 310*g*, CHERRY symbol 212*h* at symbol display area 210*h*, 2× multiplier symbol 312*h* at symbol display area 310*h*, CHERRY symbol 212*i* at symbol display area 210*i*, CHERRY symbol 312*i* at symbol display area 310*i*, CHERRY symbol 212*j* at symbol display area 210*j*, and CHERRY symbol 312*j* at symbol display area 310*j*.

In this example, each of the first plurality of symbol display areas is a designated symbol display area. Accordingly, after generating and displaying the symbols of the first and second pluralities of symbols at the first and second pluralities of symbol display areas, the gaming system determines, for each of the first plurality of symbol display areas (i.e., for each of the designated symbol display areas), whether the symbol displayed at that symbol display area has the first designated relationship or the second designated relationship with the symbol displayed at the associated one of the second plurality of symbol display areas. Message display 240 displays the following message: "PLEASE WAIT WHILE ANY RELATED SYMBOLS ARE FORMED INTO RESULTANT SYMBOLS!"

As explained above, in this example, when associated symbol display areas display the same symbol, the gaming system determines that those symbols have the first designated relationship with one another. Here, the gaming system determines that: CHERRY symbol 212*f* and CHERRY symbol 312*f*, respectively displayed at associated symbol display areas 210*f* and 310*f*, have the first designated relationship with one another; CHERRY symbol 212*g* and CHERRY symbol 312*g*, respectively displayed at associated symbol display areas 210*g* and 310*g*, have the first designated relationship with one another; CHERRY symbol 212*i* and CHERRY symbol 312*i*, respectively displayed at associated symbol display areas 210*i* and 310*i*, have the first designated relationship with one another; and CHERRY symbol 212*j* and CHERRY symbol 312*j*, respectively displayed at associated symbol display areas 210*j* and 310*j*, have the first designated relationship with one another.

Accordingly, as shown in FIG. 4B, the gaming system forms a resultant double symbol from each of those sets of two related symbols. Specifically, the gaming system forms resultant CHERRY-CHERRY symbol 412*f* from symbols 212*f* and 312*f*, resultant CHERRY-CHERRY symbol 412*g* from symbols 212*g* and 312*g*, resultant CHERRY-CHERRY symbol 412*i* from symbols 212*i* and 312*i*, and resultant CHERRY-CHERRY symbol 412*j* from symbols 212*j* and 312*j*. The gaming system displays resultant double symbol 412*f* at resultant symbol display area 410*f* (which replaces symbol display areas 210*f* and 310*f*), resultant double symbol 412*g* at resultant symbol display area 410*g* (which replaces symbol display areas 210*g* and 310*g*), resultant double symbol 412*i* at resultant symbol display area 410*i* (which replaces symbol display areas 210*i* and 310*i*), and resultant double symbol 412*j* at resultant symbol display area 410*j* (which replaces symbol display areas 210*j* and 310*j*).

As explained above, in this example, when a symbol display area displays a multiplier symbol, the multiplier symbol and the non-multiplier symbol displayed at the associated symbol display area have the second designated relationship with one another. Here, the gaming system determines that CHERRY symbol 212*h* and 2× multiplier symbol 312*h*, respectively displayed at associated symbol display areas 210*h* and 310*h*, have the second designated relationship with one another. Accordingly, as shown in FIG. 4B, the gaming system forms a resultant symbol 412*h* including the CHERRY symbol and a 2× multiplier. The gaming system displays resultant symbol 412*h* at resultant symbol display area 410*h* (which replaces symbol display areas 210*h* and 310*h*).

In this illustrated example, since none of the symbols displayed at any other associated symbol display areas have the first or the second designated relationship with one another, the gaming system "grays out," "crosses out," or otherwise indicates that those symbol display areas do not display symbols that have the first or second designated relationship with one another.

In this example, the gaming system makes an award determination based on the resultant symbols and not based on any of the other, non-resultant symbols. Here, the gaming system determines whether the resultant symbols form any of a plurality of winning symbol combinations along paylines A, B, C, D, and/or E. In this example, the gaming system determines an award of 300 credits for resultant symbols 412*f*, 412*g*, 412*h*, 412*i*, and 412*j* displayed from left to right at resultant symbol display areas 410*f*, 410*g*, 410*h*, 410*i*, and 410*j*, respectively, along payline B. That is, the gaming system determines a 300 credit award for the nine instances of the CHERRY symbol displayed along payline B. The gaming system employs the 2× multiplier to increase the award to a total award of 600 credits. The gaming system displays the 600 credit total award in award indicator 270 and updates the player's credit balance indicated by credit meter 250 to 695 credits to reflect the 300 credit total award. Message display 240 displays the following message: "CONGRATULATIONS, YOU WIN 300 CREDITS FOR THE DISPLAYED CHERRY-CHERRY-CHERRY-CHERRY-CHERRY-CHERRY-CHERRY-CHERRY-CHERRY WINNING SYMBOL COMBINATION MULTIPLIED BY THE 2× MULTIPLIER FOR A TOTAL AWARD OF 600 CREDITS!"

In other embodiments, when two symbols that have a designated relationship with one another are displayed at associated symbol display areas, the gaming system provides a certain feature, award, or award opportunity to the player. In one such embodiment, the feature is a wild reel expansion in which the gaming system replaces all of the displayed symbols on the reel(s) associated with the two related symbols with wild symbols.

Figure 5A:
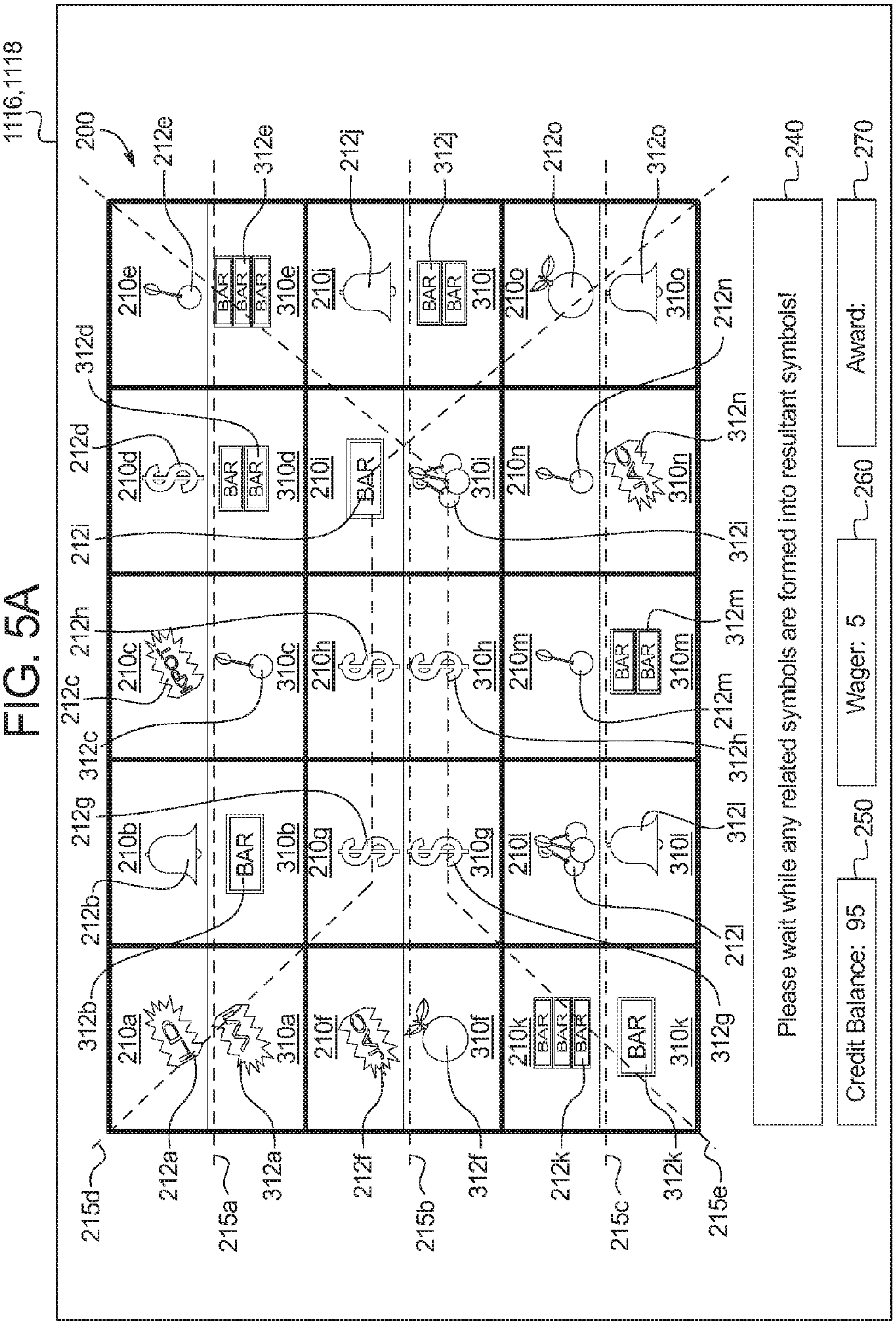
FIGS. 5A, 5B, and 5C illustrate screen shots of another example embodiment of the gaming system of the present disclosure configured to operate another example of the multiplay game of the present disclosure.
Figure 5B:
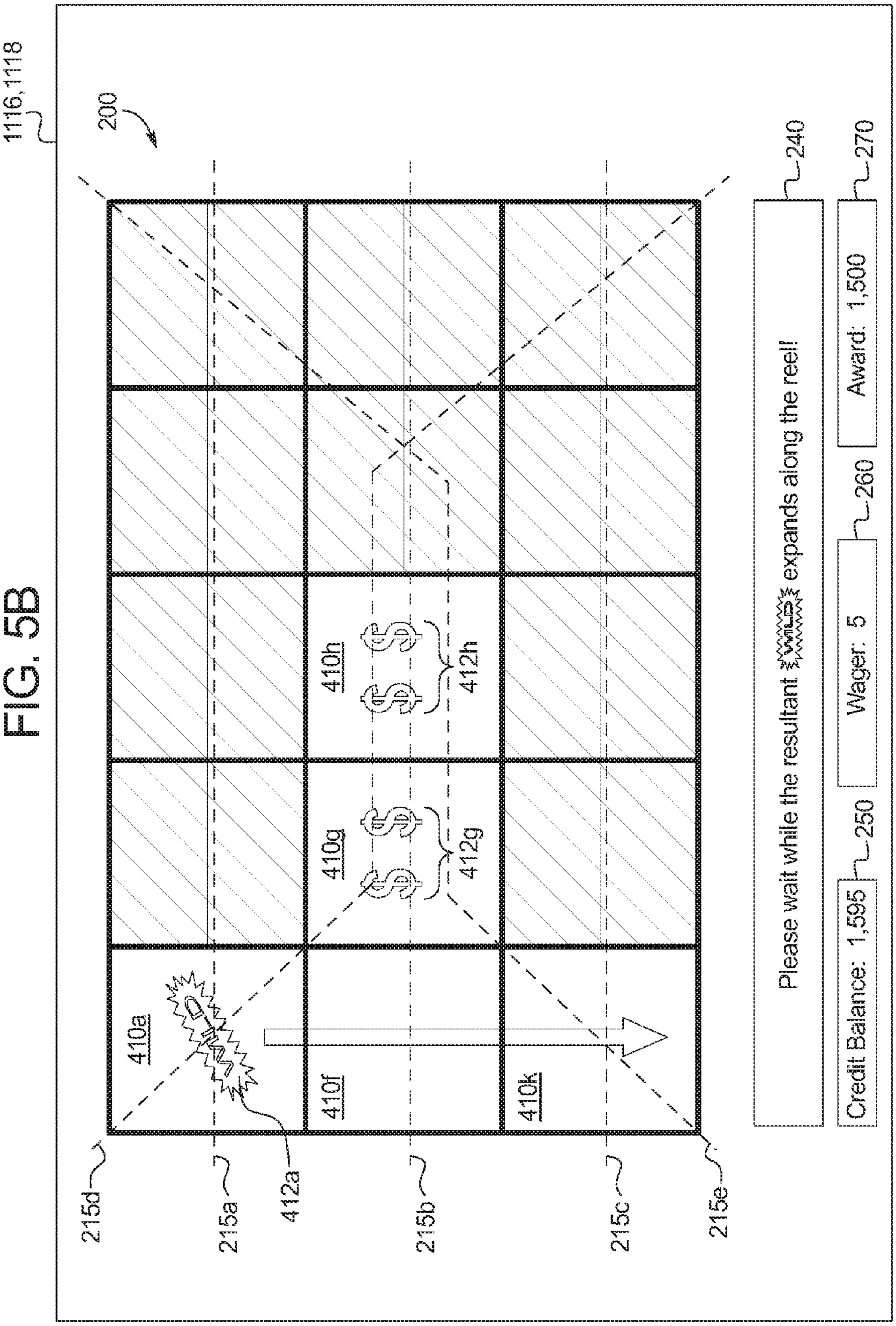
Figure 5C:
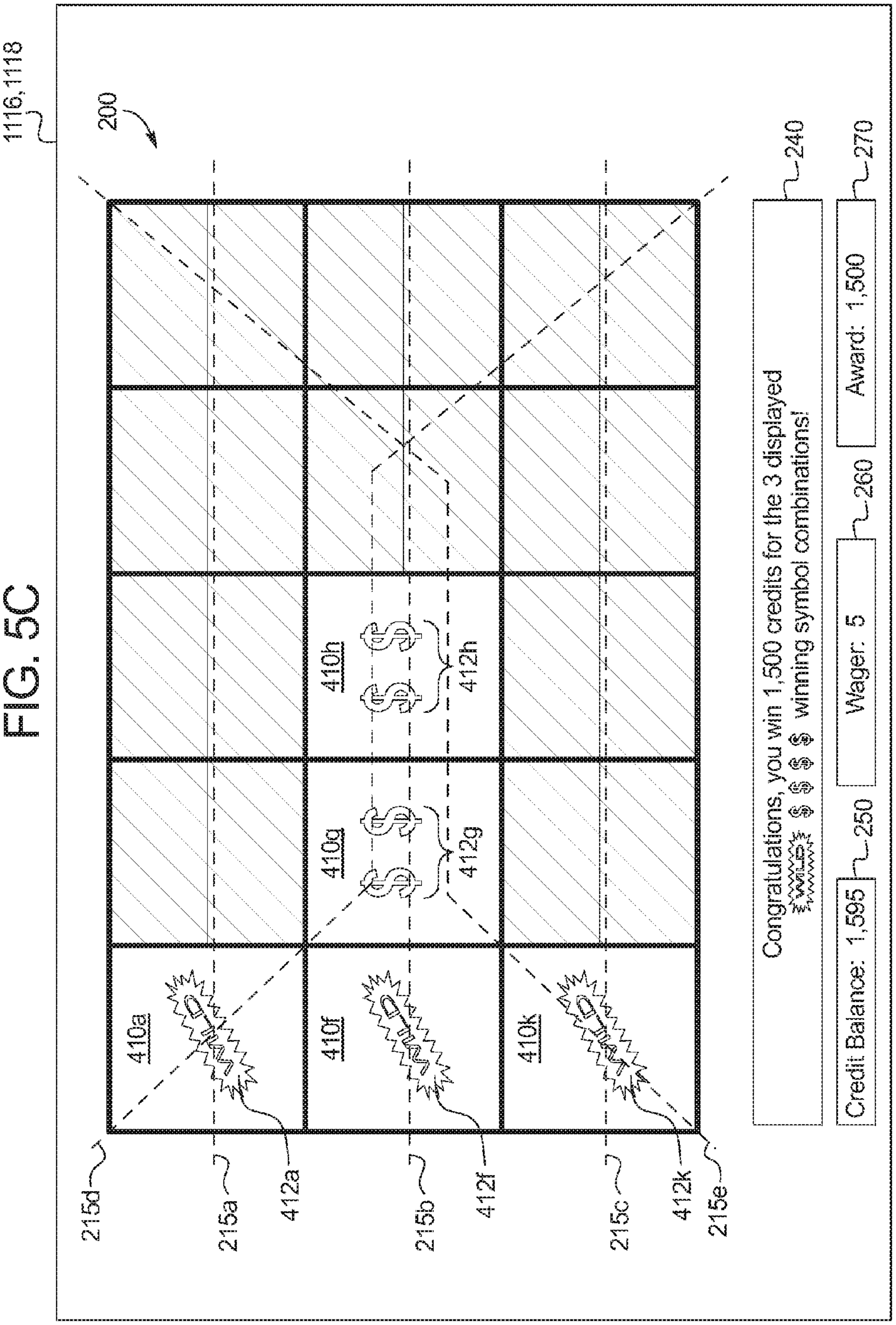

FIGS. 5A, 5B, and 5C illustrate screen shots of an example of one such embodiment of the multiplay game. In this example, the first plurality of symbols and the second plurality of symbols each include a plurality of identical symbols. For instance, the first plurality of symbols and second plurality of symbols each include a CHERRY symbol and a TRIPLE BAR symbol. Additionally, the first plurality of symbols includes an UPPER HALF WILD symbol and the second plurality of symbols includes a LOWER HALF WILD symbol.

In this example, the symbols of the first plurality of symbols and the second plurality of symbols that are identical have a first designated relationship with one another. For instance, the CHERRY symbol of the first plurality of symbols and the CHERRY symbol of the second plurality of symbols have the first designated relationship with one another. When two symbols displayed at associated symbol display areas have the first designated relationship with one another, the gaming system forms a resultant double symbol including two instances of that symbol. For instance, if the CHERRY symbol is displayed at two associated symbol display areas, the gaming system forms a resultant CHERRY-CHERRY symbol from those two CHERRY symbols. It should thus be appreciated that, in this example, when two symbols that have the first designated relationship with one another are displayed at associated symbol display areas, the gaming system produces a higher multiplicity symbol (a double symbol in this example) to replace those two symbols.

Additionally, in this example, the UPPER HALF WILD symbol and the LOWER HALF WILD symbol have a second designated relationship with one another. When the UPPER HALF WILD symbol is displayed at one of the first plurality of symbol display areas and the LOWER HALF WILD symbol is displayed at the associated one of the second plurality of symbol display areas, the gaming system forms a resultant WILD symbol from those two symbols. The WILD symbol is, in this example, not otherwise obtainable. That is, neither the first plurality of symbols nor the second plurality of symbols includes the WILD symbol. The gaming system also replaces any symbols displayed at the symbol display areas located in the same column of matrix positions as the resultant WILD symbol with resultant WILD symbols.

Although not displayed, in this example, a player funds the gaming system by depositing value. The gaming system provides the player with 100 credits, which represent the deposited value. The player subsequently places a wager of 5 credits. As illustrated in FIG. 5A, upon initiation of a play of the multiplay game, the gaming system generates and displays a plurality of the first plurality of symbols at the first plurality of symbol display areas and independently generates and displays a plurality of the second plurality of symbols at the second plurality of symbol display areas. Specifically, in this illustrated example, the gaming system generates and displays, in pertinent part: UPPER HALF WILD symbol 212*a* at symbol display area 210*a*, LOWER HALF WILD symbol 312*a* at symbol display area 310*a*, DOLLAR SIGN symbol 212*g* at symbol display area 210*g*, DOLLAR SIGN symbol 312*g* at symbol display area 310*g*, DOLLAR SIGN symbol 212*h* at symbol display area 210*h*, and DOLLAR SIGN symbol 312*h* at symbol display area 310*h*.

In this example, each of the first plurality of symbol display areas is a designated symbol display area. Accordingly, after generating and displaying the symbols at the symbol display areas the gaming system determines, for each of the first plurality of symbol display areas, whether the symbol displayed at that symbol display area has the first designated relationship or the second designated relationship with the symbol displayed at the associated one of the second plurality of symbol display areas. Message display 240 displays the following message: "PLEASE WAIT WHILE ANY RELATED SYMBOLS ARE FORMED INTO RESULTANT SYMBOLS!"

As explained above, in this example, when associated symbol display areas display the same symbol, the gaming system determines that those symbols have the first designated relationship with one another. Here, the gaming system determines that: DOLLAR SIGN symbol 212*g* and DOLLAR SIGN symbol 312*g*, respectively displayed at associated symbol display areas 210*g* and 310*g*, have the first designated relationship with one another; and DOLLAR SIGN symbol 212H and DOLLAR SIGN symbol 312*h*, respectively displayed at associated symbol display areas 210*h* and 310*h*, have the first designated relationship with one another.

Accordingly, as shown in FIG. 5B, the gaming system forms a resultant double symbol from each of those sets of two symbols. Specifically, the gaming system forms resultant DOLLAR SIGN-DOLLAR SIGN symbol 412*g* from symbols 212*g* and 312*g* and resultant DOLLAR SIGN-DOLLAR SIGN symbol 412*h* from symbols 212*h* and 312*h*. The gaming system displays resultant double symbol 412*g* at resultant symbol display area 410*g* (which replaces symbol display areas 210*g* and 310*g*) and resultant double symbol 412*h* at resultant symbol display area 410*h* (which replaces symbol display areas 210*h* and 310*h*). As explained above, in this example, the UPPER HALF WILD symbol and the LOWER HALF WILD symbol have the second designated relationship with one another. Here, the gaming system determines that UPPER HALF WILD symbol 212*a* and LOWER HALF WILD symbol 312*a*, respectively displayed at associated symbol display areas 210*a* and 310*a*, have the second designated relationship with one another. Accordingly, the gaming system forms resultant WILD symbol 412*a* from those two symbols. Message display 240 displays the following message: "PLEASE WAIT WHILE THE RESULTANT WILD EXPANDS ALONG THE REEL!"

In this illustrated example, since none of the symbols displayed at any other associated symbol display areas have the first or the second designated relationship with one another, the gaming system "grays out," "crosses out," or otherwise indicates that those symbol display areas do not display symbols that have the first or second designated relationships with one another.

As illustrated in FIG. 5C, the gaming system also replaces symbols 212*f* and 312*f*, displayed at symbol display areas 210*f* and 310*f*, respectively, with resultant WILD symbol 412*f*, and symbols 212*k* and 312*k*, displayed at symbol display areas 210*k* and 310*k*, respectively, with resultant WILD symbol 412*k*. The gaming system displays resultant WILD symbol 412*a* at resultant symbol display area 410*a* (which replaces symbol display areas 210*a* and 310*a*), resultant WILD symbol 412*f* at resultant symbol display area 410*f* (which replaces symbol display areas 210*f* and 310*f*), and resultant WILD symbol 412*k* at resultant symbol display area 410*k* (which replaces symbol display area 210*k* and 310*k*).

In this example, the gaming system makes an award determination based on the resultant symbols and not based on any of the other, non-resultant symbols. Here, the gaming system determines whether the resultant symbols form any of a plurality of winning symbol combinations along paylines A, B, C, D, and/or E. In this example, the gaming system determines: (a) an award of 500 credits for resultant symbols 412*a*, 412*g*, and 412*h* displayed from left to right at resultant symbol display areas 410*a*, 410*g*, and 410*h*, respectively, along payline D; (b) an award of 500 credits for resultant symbols 412*f*, 412*g*, and 412*h* displayed from left to right at resultant symbol display areas 410*f*, 410*g*, and 410*h*, respectively, along payline B; and (c) an award of 500 credits for resultant symbols 412*k*, 412*g*, and 412*h* displayed from left to right at resultant symbol display areas 410*k*, 410*g*, and 410*h*, respectively, along payline E. That is, the gaming system determined a total award of 1,500 credits for the five instances of the DOLLAR SIGN symbol (resultant WILD symbols 412*a*, 412*f*, and 412*k* act as the DOLLAR SIGN symbol to maximize the player's award) displayed along paylines B, D, and E. The gaming system displays the 1,500 credit award in award indicator 270 and updates the player's credit balance indicated by credit meter 250 to 1,595 credits to reflect the 1,500 credit award. Message display 240 displays the following message: "CONGRATULATIONS, YOU WIN 1,500 CREDITS FOR THE DISPLAYED WILD-DOLLAR SIGN-DOLLAR SIGN-DOLLAR SIGN-DOLLAR SIGN WINNING SYMBOL COMBINATION!"

It should be appreciated that the feature, award, or award opportunity may be any suitable feature, award, or award opportunity in addition to or instead of a reel including stacked wilds, such as one or more of: (a) monetary credits or currency; (b) non-monetary credits or currency; (c) a multiplier for use in the current play of the multiplay game, one or more future plays of the multiplay game, and/or one or more future plays of the a bonus game; (d) one or more free plays of the multiplay game (such as one or more free spins); (e) one or more plays of one or more bonus games other than the multiplay game (such as a free spin of an award wheel); (f) one or more lottery based awards, such as lottery or drawing tickets; (g) a wager match for one or more plays of the multiplay game; (h) an increase in the average expected payback percentage of the multiplay game and/or a bonus game for one or more plays of those games; (i) one or more comps, such as a free dinner, a free night's stay at a hotel, a high value product such as a free car, or a low value product such as a free teddy bear; (j) one or more bonus or promotional credits usable for online play; (k) a lump sum of player tracking points or credits; (l) a multiplier for player tracking points or credits; (m) an increase in a membership or player tracking level; (n) coupons or promotions usable within a gaming establishment and/or outside of the gaming establishment (e.g., a 20% off coupon for use at a convenience store or a promotional code providing a deposit match for use in association with an online casino); (o) an access code usable to unlock content on the internet; and (p) an additional set of reels (i.e., plurality of symbol display areas) for one or more plays of the multiplay game at no additional cost to the player.

In other embodiments, the gaming system does not display associated symbol display areas adjacent to one another in a single matrix position of a displayed matrix. Rather, in these embodiments, the gaming system displays multiple distinct matrices of symbol display areas. Specifically, as illustrated in FIGS. 6A, 6B, 6C, 7A, 7B, 8A, 8B, 9A, and 9B, in these embodiments the gaming system displays a first matrix 2200 including a plurality of matrix positions each including one of the first plurality of symbol display areas, a second matrix 2300 including a plurality of matrix positions each including one of the second plurality of symbol display areas, and a resultant matrix 2400 including a plurality of resultant symbol display areas.

Figure 6A:
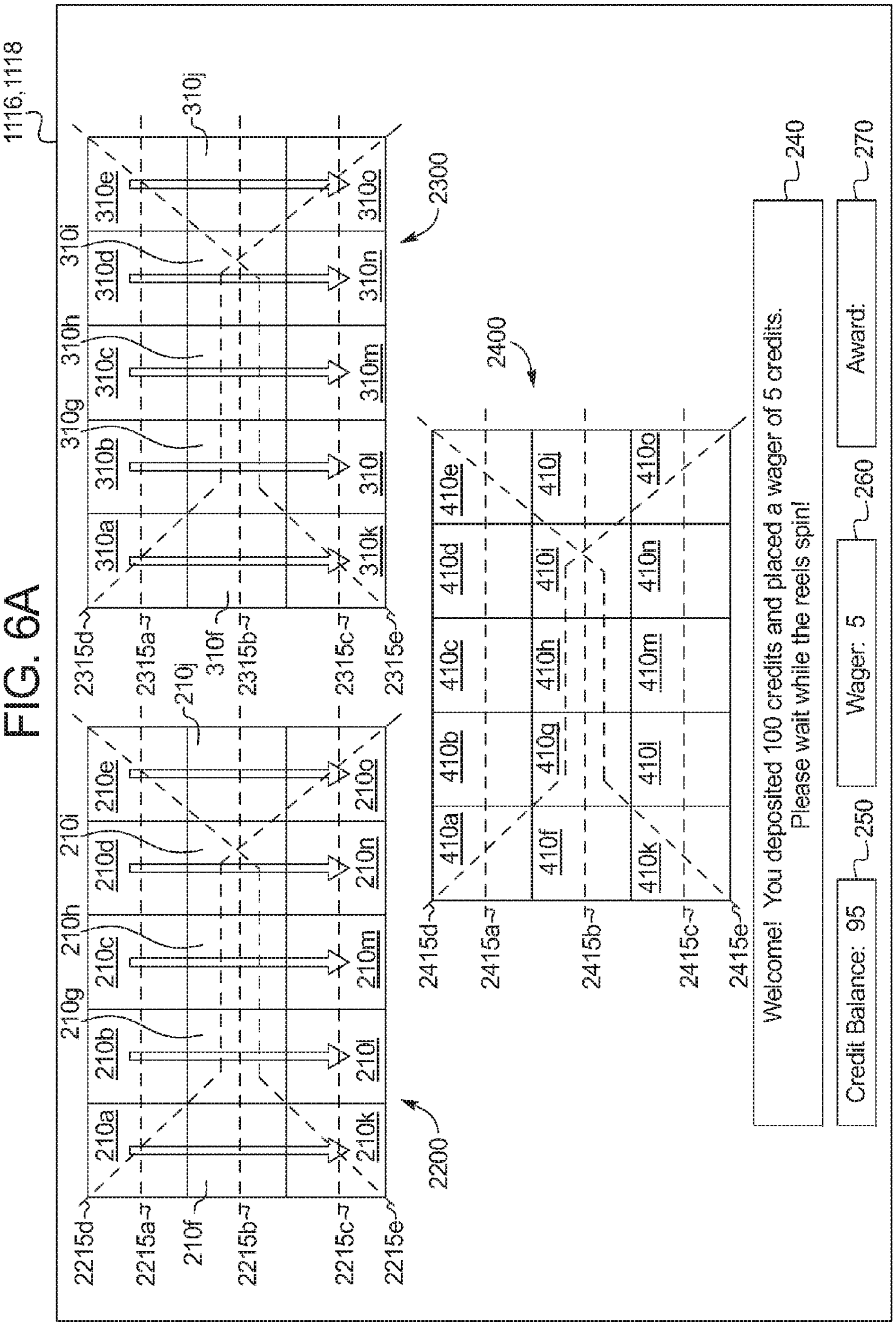
FIGS. 6A, 6B, and 6C illustrate screen shots of another example embodiment of the gaming system of the present disclosure configured to operate another example of the multiplay game of the present disclosure.
Figure 6B:
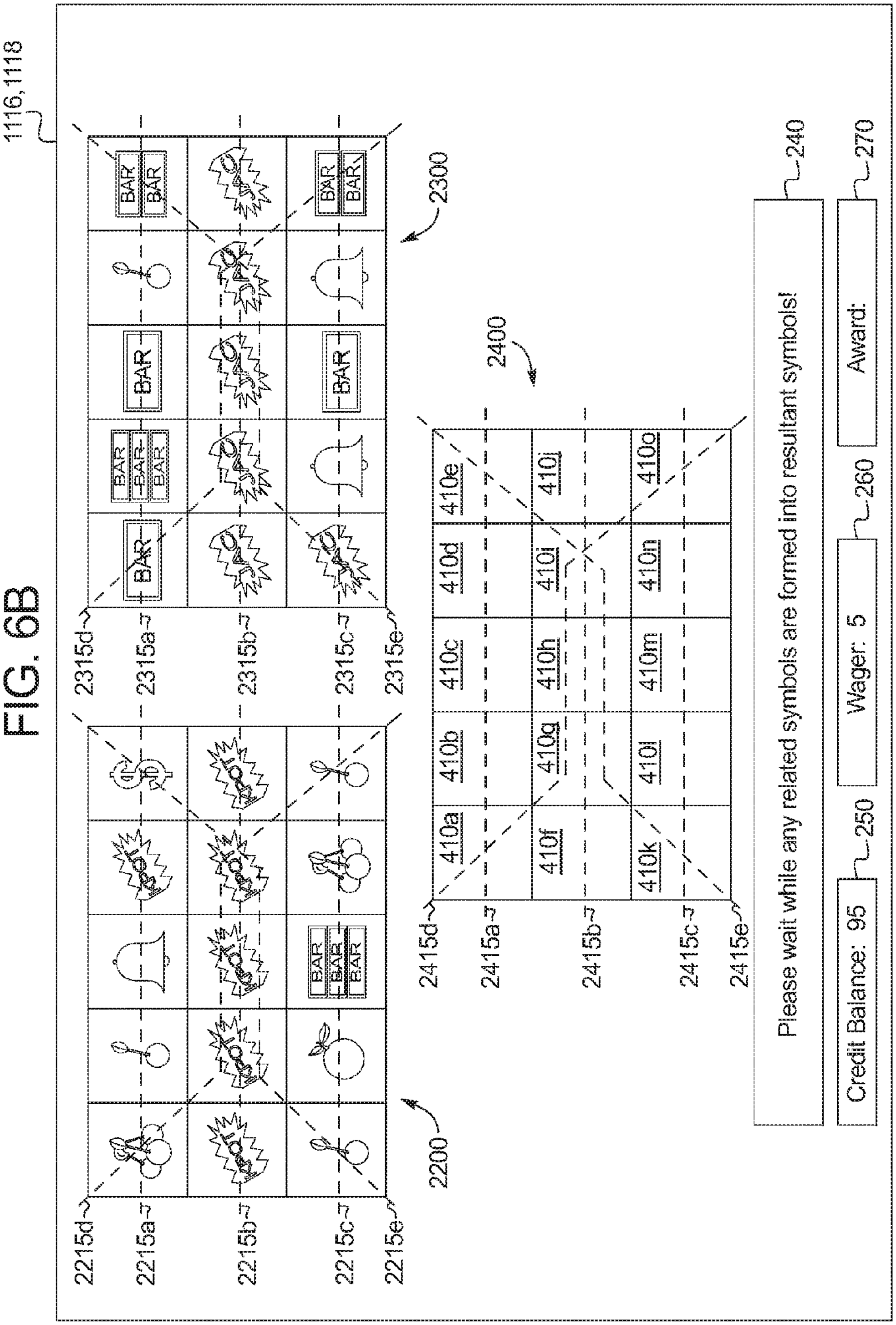
Figure 6C:
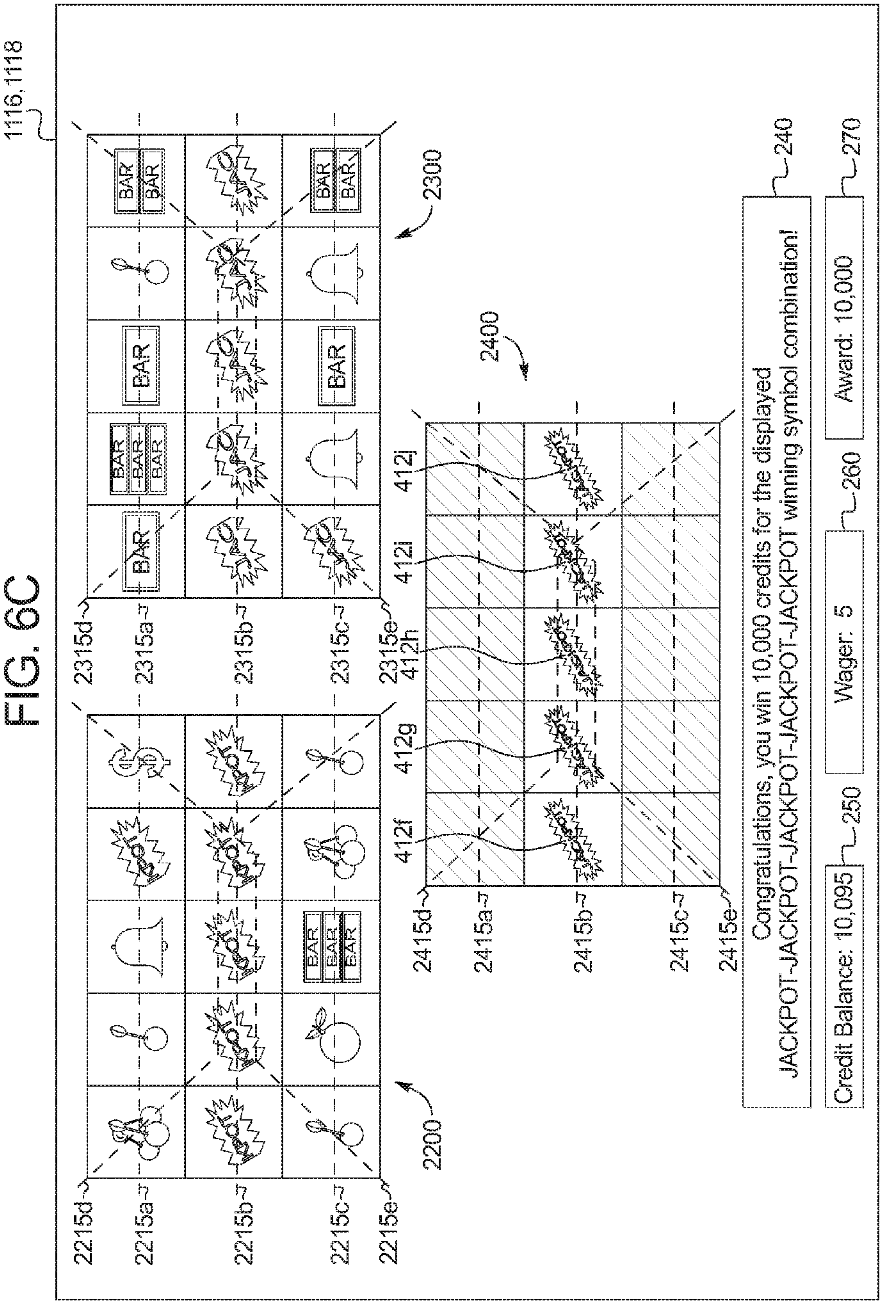
Figure 7A:
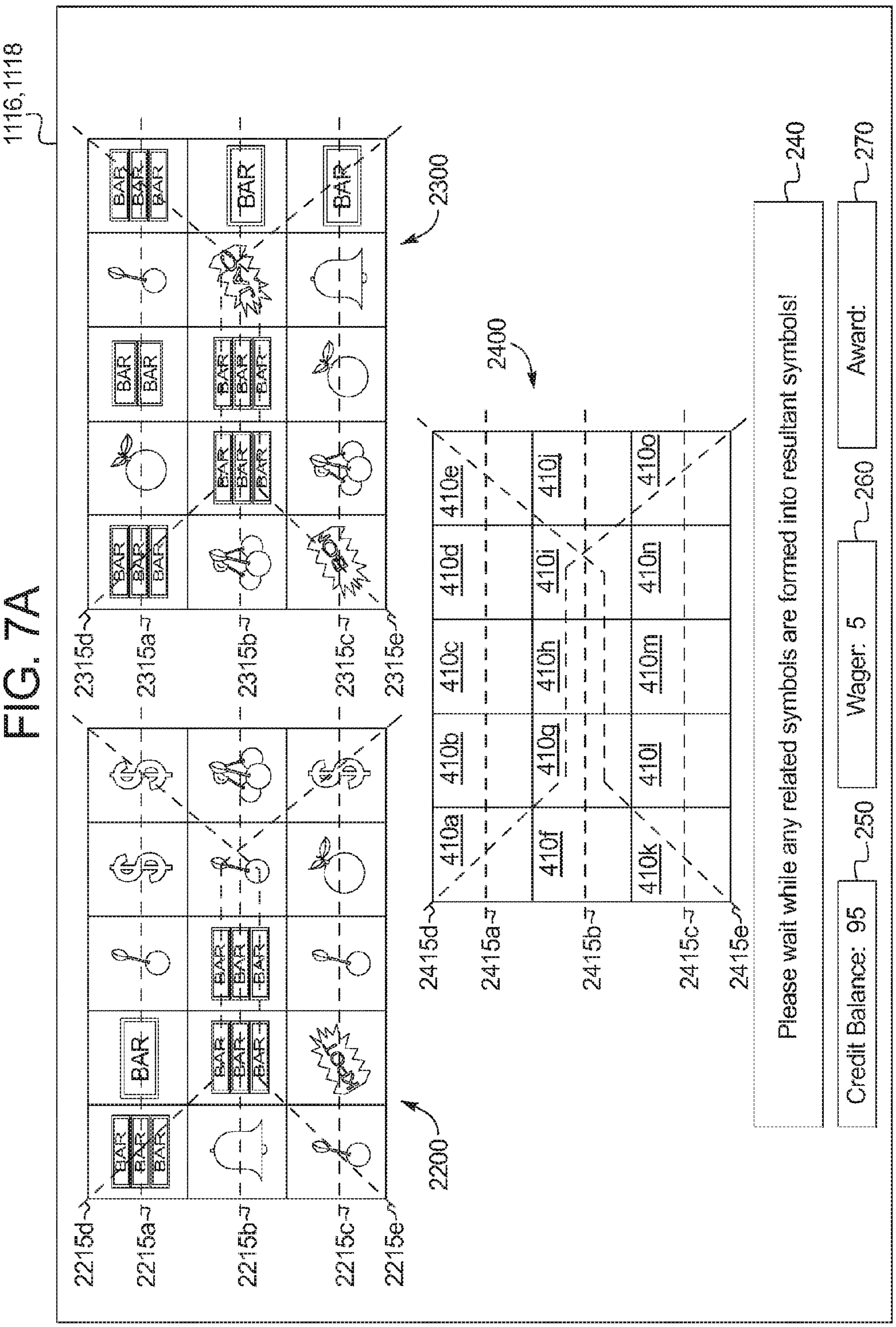
FIGS. 7A and 7B illustrate screen shots of another example embodiment of the gaming system of the present disclosure configured to operate another example of the multiplay game of the present disclosure.
Figure 7B:
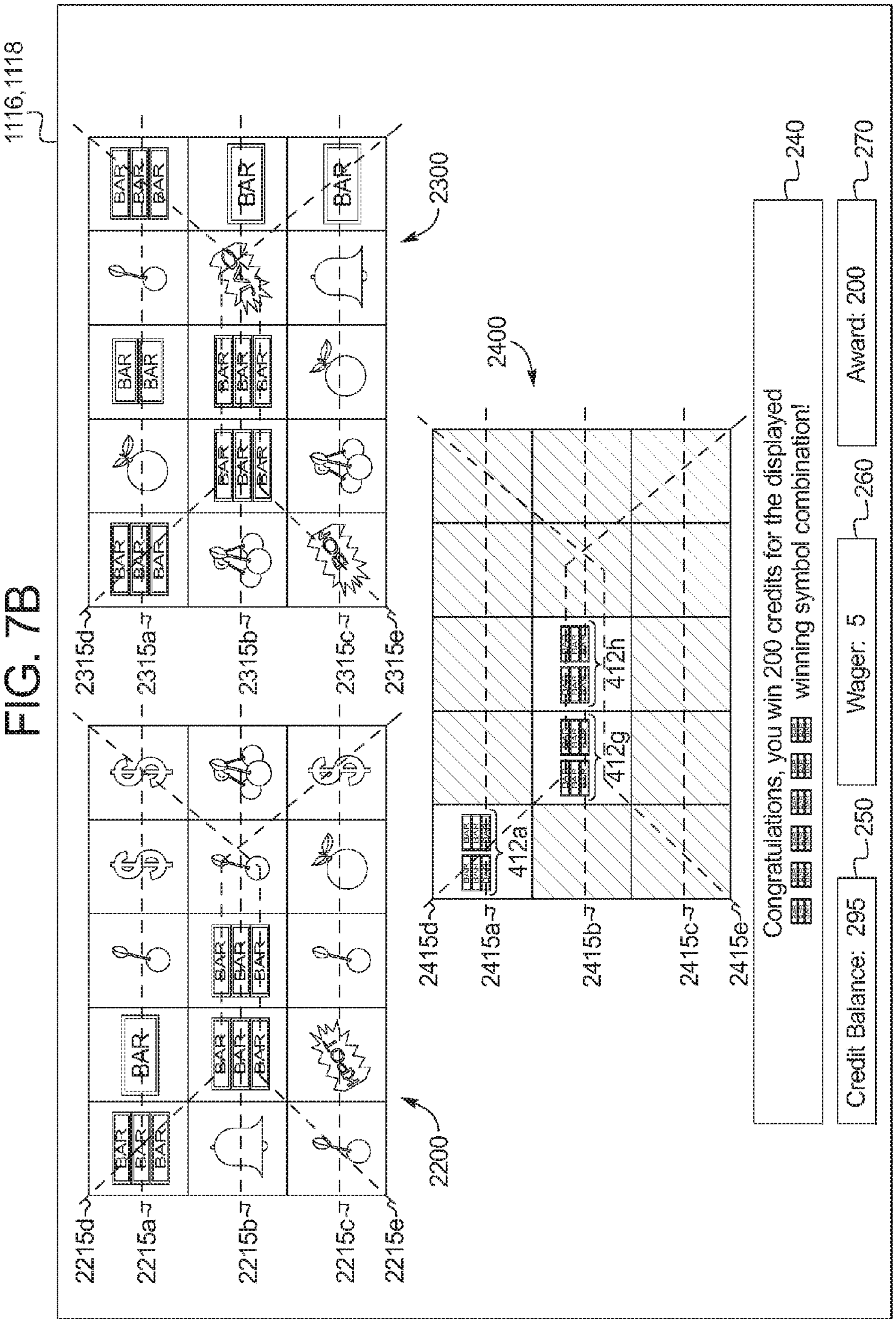
Figure 8A:
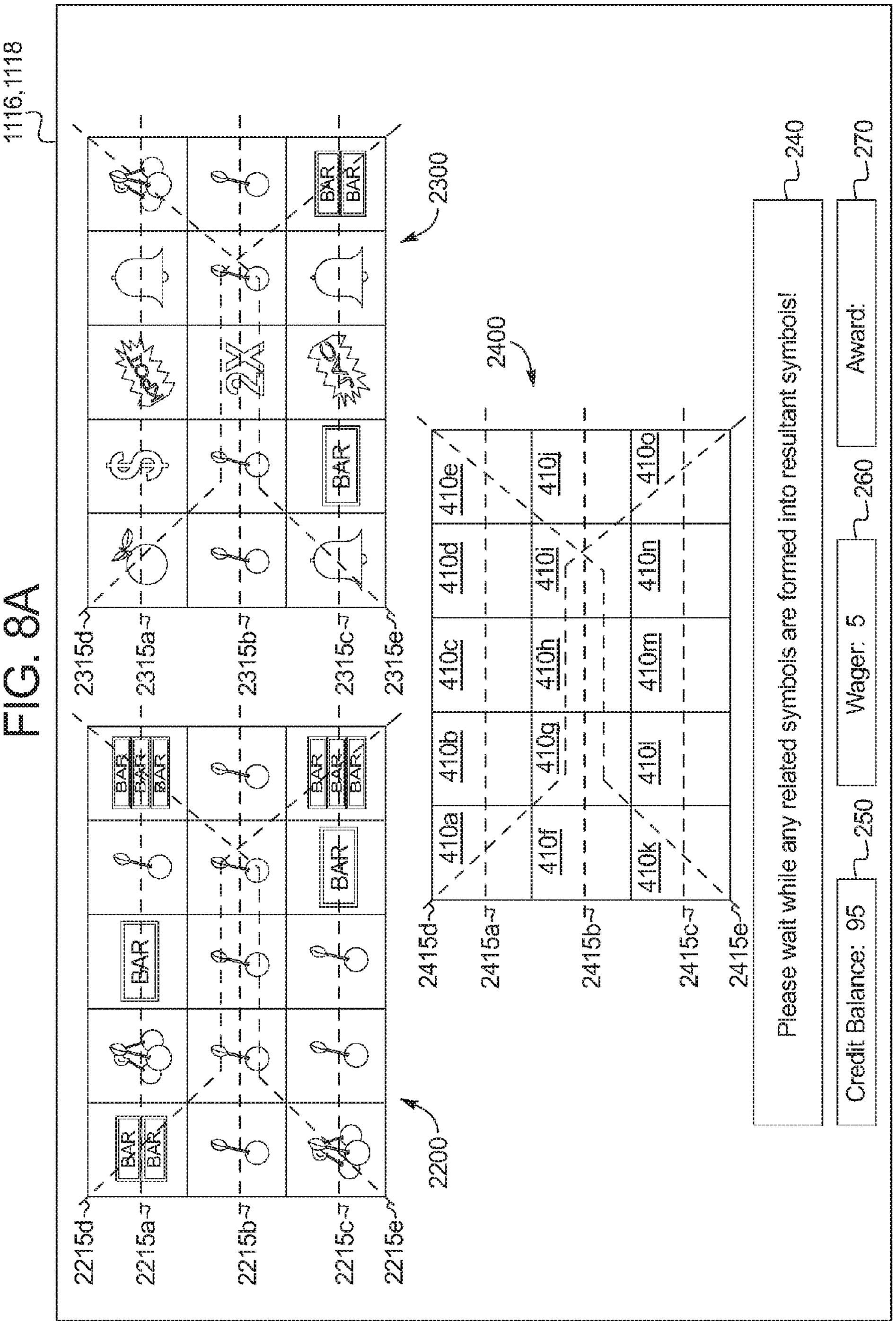
FIGS. 8A and 8B illustrate screen shots of another example embodiment of the gaming system of the present disclosure configured to operate another example of the multiplay game of the present disclosure.
Figure 8B:
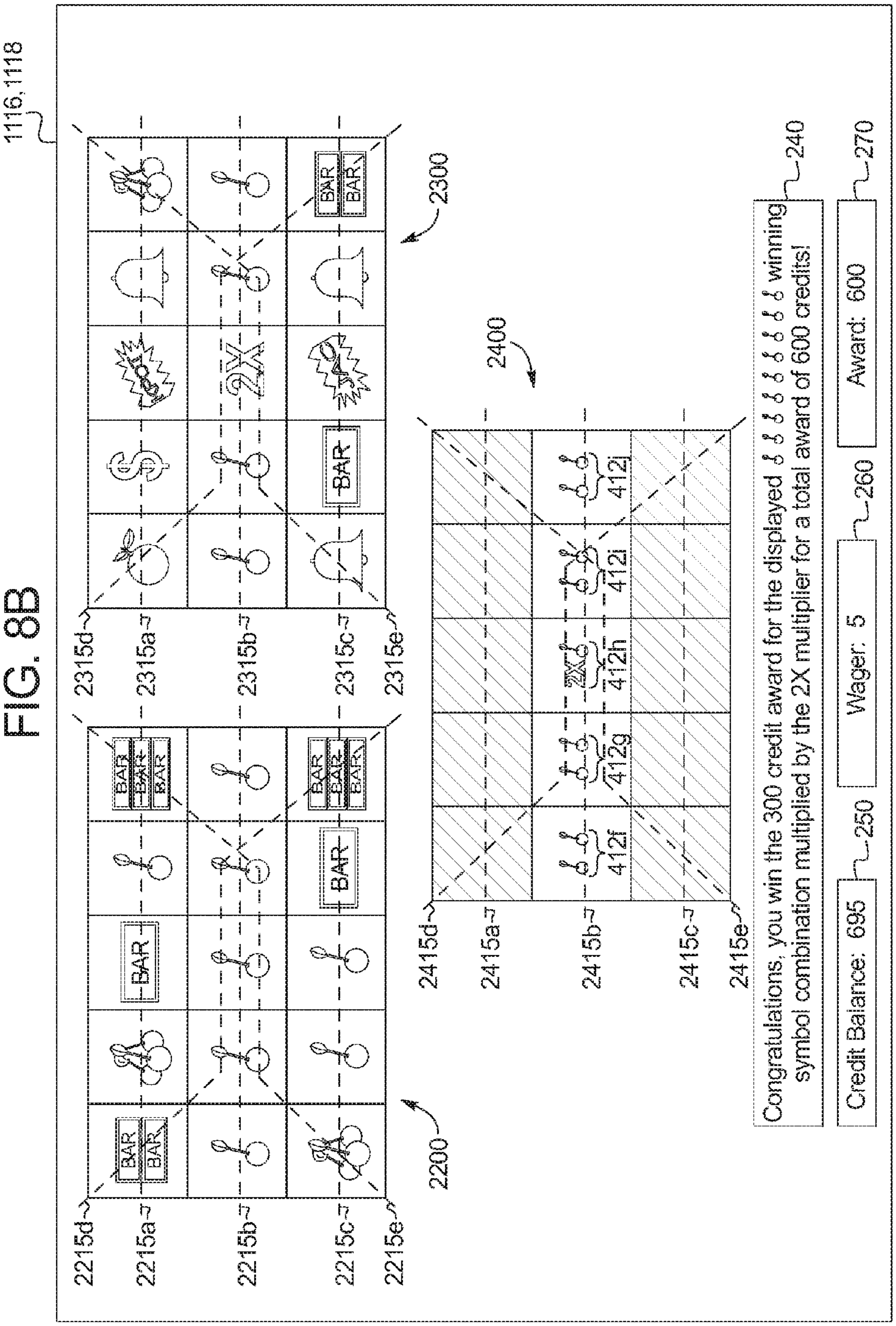
Figure 9A:
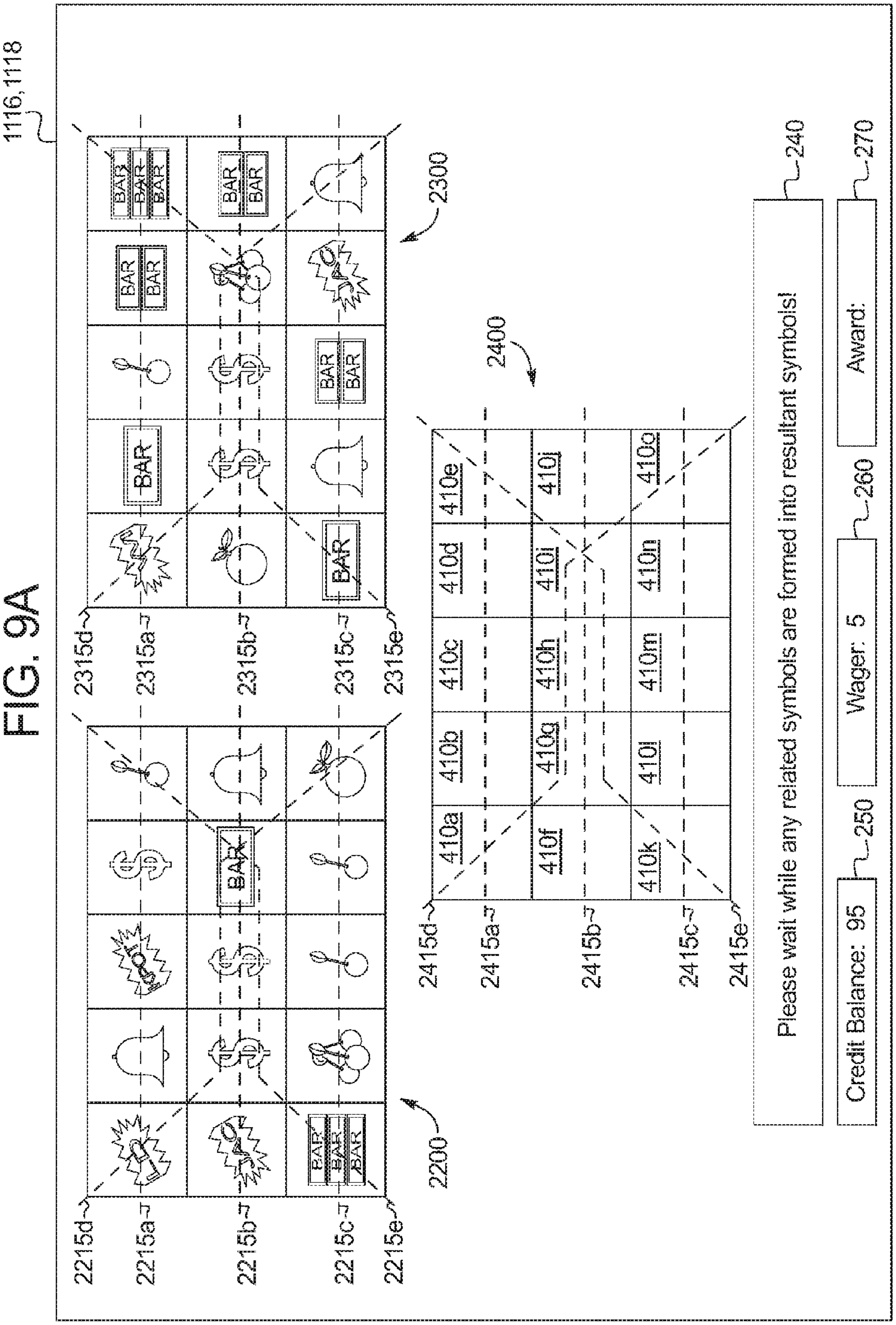
FIGS. 9A and 9B illustrate screen shots of another example embodiment of the gaming system of the present disclosure configured to operate another example of the multiplay game of the present disclosure.
Figure 9B:
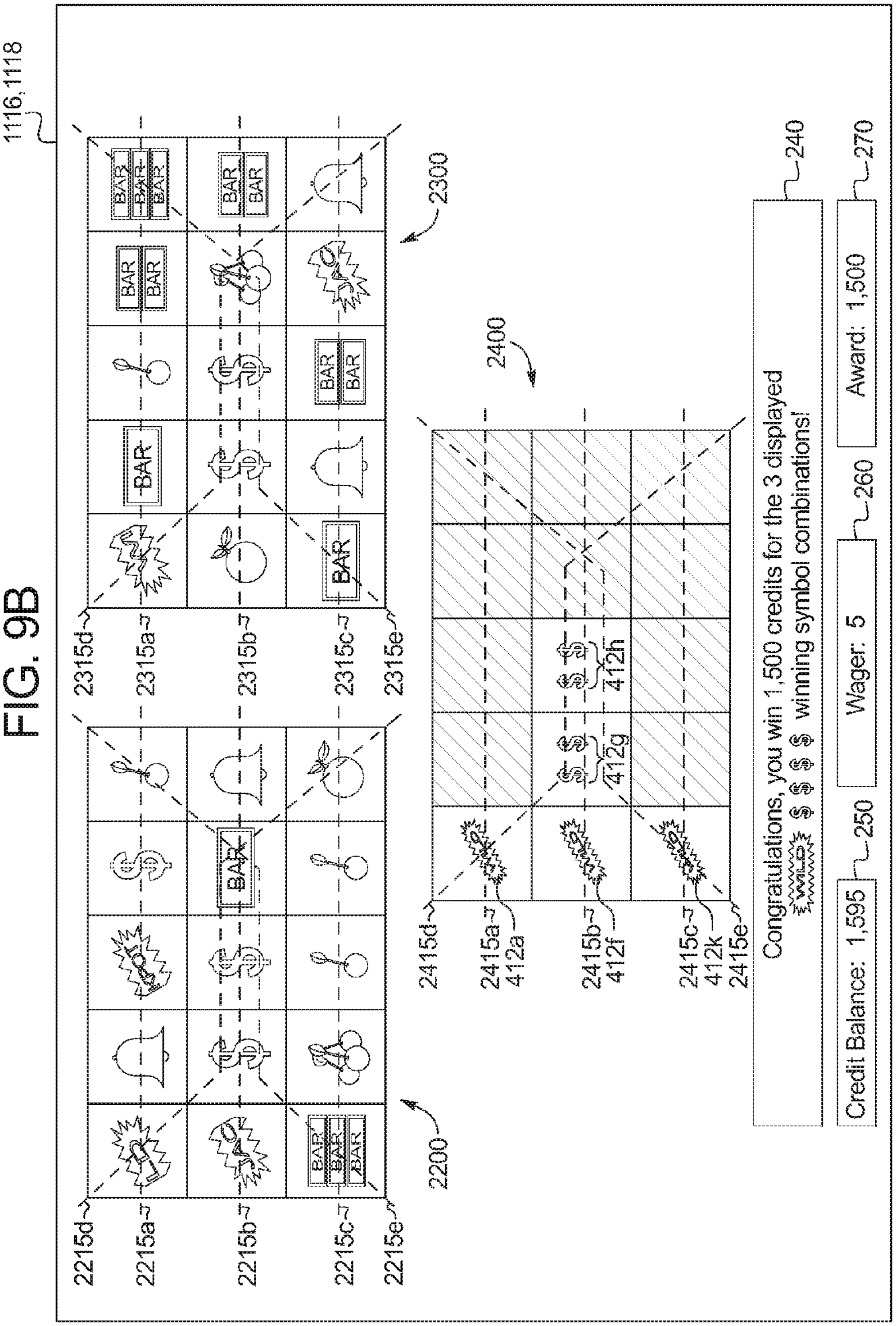

FIGS. 6A, 6B, and 6C illustrate a plurality of screen shots of the example embodiment of the multiplay game shown in FIGS. 2A, 2B, and 2C, but with multiple distinct matrices of symbol display areas 2200 (configured to display symbols of the first plurality of symbols), 2300 (configured to display symbols of the second plurality of symbols), and 2400 (configured to display any resultant symbols). FIGS. 7A and 7B illustrate a plurality of screen shots of the example embodiment of the multiplay game shown in FIGS. 3A and 3B, but with the multiple distinct matrices of symbol display areas described above. FIGS. 8A and 8B illustrate a plurality of screen shots of the example embodiment of the multiplay game shown in FIGS. 4A and 4B, but with the multiple distinct matrices of symbol display areas described above. FIGS. 9A and 9B illustrate a plurality of screen shots of the example embodiment of the multiplay game shown in FIGS. 5A, 5B, and 5C, but with the multiple distinct matrices of symbol display areas described above. The descriptions of these example embodiments are not repeated for brevity.

In various embodiments, the gaming system makes a single award determination for any symbols displayed at the first plurality of symbol display areas, the second plurality of symbol display areas, and any resultant symbols. In other words, in these embodiments, the gaming system considers all displayed symbols when determining any awards instead of (or in addition to) making one or more award determinations associated with a subset of the displayed symbols (e.g., an award determination based on any resultant symbols and not based on any non-resultant symbols, an award determination based on the displayed symbols of the first plurality of symbols and not based on the displayed symbols of the second plurality of symbols or any resultant symbols, and the like).

In certain embodiments, the gaming system makes additional award determinations associated with each of the first and second pluralities of symbol display areas. That is, in these embodiments, the gaming system makes: (a) a first independent award determination for the symbols displayed at the first plurality of symbol display areas, but not the symbols displayed at the second plurality of symbol display areas or any resultant symbols; (b) a second independent award determination for the symbols displayed at the second plurality of symbol display areas, but not the symbols displayed at the first plurality of symbol display areas or any resultant symbols; and (c) a third independent award determination for any resultant symbols and not for any non-resultant symbols. That is, each of these award determinations are separate and distinct from one another.

It should be appreciated that the types of designated relationships described above are merely example designated relationships, and that any other suitable relationships between symbols may be designated relationships. While certain designated relationships are based on a related visual characteristic of two symbols (e.g., upper and lower halves of a single resultant symbol, the symbols being the same symbol, and the like), it should be appreciated that certain designated relationships are independent of whether two symbols have a related visual characteristic.

For instance, in one embodiment, symbols having the same award values have a designated relationship with one another, regardless of the visual characteristics of those symbols. Thus, in this embodiment, when symbols having the same award value are generated and displayed in associated symbol display areas, the gaming system forms a resultant symbol from those two symbols.

In certain embodiments, designated relationships are determined on a per-spin basis. That is, for each spin, the gaming system determines which symbols have a designated relationship with one another. For instance, for each spin, the gaming system determines (such as randomly) two of a plurality of elements (such as fire, water, wind, and earth) to have a designated relationship with one another. If symbols associated with the two determined elements are respectively displayed at associated symbol display areas, the gaming system forms a resultant symbol from those two symbols.

In various embodiments, only certain types or categories of symbols may have a designated relationship with one another. In one embodiment, only major symbols (e.g., symbols associated with high value winning symbol combinations, such as those associated with a jackpot award), may have a designated relationship with one another. That is, in this embodiment, minor symbols (e.g., symbols associated with no winning symbol combination or with a low value winning symbol combination, such as a those associated with a minimum award) may not have a designated relationship with one another. In other embodiments, however, there are no restrictions as to which types or categories of symbols may have a designated relationship with one another.

It should be appreciated that any quantity of the first plurality of symbol display areas may be designated symbol display areas. It should also be appreciated that any of the symbol display areas of the first plurality of symbol display areas may be designated symbol display areas. In certain embodiments, the quantity of the first plurality of symbol display areas that are designated symbol display areas and/or which specific symbol display areas of the first plurality of symbol display areas are designated symbol display areas is determined based on one or more of: (a) a random determination, (b) a predetermined criteria or order, (c) a probability distribution, (d) player choice, (e) the player's wager, (f) an outcome of a play of the multiplay game, (g) an outcome of one or more of the individual sets of symbol display areas, (h) player coin-in, and (i) a player tracking level or membership status.

In certain embodiments, the gaming system includes more than two pluralities of symbol display areas and more than two pluralities of symbols. Specifically, in certain embodiments, the gaming system includes any suitable number of pluralities of symbols and associated pluralities of symbol display areas. For instance, the gaming system includes a first plurality of symbols and a first plurality of symbol display areas each configured to display one of the first plurality of symbols, a second plurality of symbols and a second plurality of symbol display areas each configured to display one of the second plurality of symbols, a third plurality of symbols and a third plurality of symbol display areas each configured to display one of the third plurality of symbols, and a fourth plurality of symbols and a fourth plurality of symbol display areas each configured to display one of the fourth plurality of symbols.

It should be appreciated that, in various embodiments: (a) the multiplay game may be associated with, and the gaming system may display, any suitable quantity of sets of reels (and associated sets of symbol display areas) in any suitable configuration or arrangement; (b) the multiplay game may be associated with, and the gaming system may display, any suitable quantity of paylines; (c) each of the displayed paylines may be associated with any suitable quantity of the symbol display areas and any suitable combination of the symbol display areas; (d) the gaming system may use any other suitable manner of award determination other than a payline evaluation, such as a ways to win and/or a scatter pay award determination (as described below); (e) the gaming system may employ suitable paytable including any suitable quantity of winning symbol combinations; (f) the gaming system may use any suitable combination of the symbols as a winning symbol combination; (g) the winning symbol combinations may be associated with any suitable credit payouts; (h) the gaming system may utilize any suitable quantity of paytables; and (i) the gaming system may employ any suitable symbols including, for example, any suitable markings or indicia such as letters, numbers, or illustrations or pictures of objects.

It should be appreciated that the present disclosure contemplates providing such a game in a multiplayer or community gaming format in which the gaming system includes a plurality of EGMs each playable by a different player. In one example, two players participate in a free spin bonus game. The first player's EGM is configured to generate and display a first symbol (such as the left half of a key) during the free spin bonus game, and the second player's EGM is configured to generate and display a second symbol (such as the right half of a key) during the free spin bonus game. The first symbol and the second symbol have a designated relationship with one another. If the first player's EGM generates and displays the first symbol during the free spin bonus, the gaming system displays the first symbol on a community display, and if the second player's EGM generates and displays the second symbol during the free spin bonus, the gaming system displays the second symbol on the community display. If the first symbol and the second symbol are simultaneously displayed on the community display, the gaming system: (a) forms a resultant symbol (such as a key symbol), increases a total quantity of collected resultant symbols (such as by one), and removes the displayed resultant symbol. If at least a designated quantity of resultant symbols are collected during the free spin bonus game, the gaming system provides an award (such as a quantity of credits, a progressive award, additional free spins, entrance into another bonus game, or any other suitable award) to the first player and the second player.

In a more general example, a designated percentage of EGMs in a bank (such as half of the EGMs in a bank) are configured to generate and display the first symbol and the remaining EGMs are configured to generate and display the second symbol. If the players of all of the EGMs participate in the free spins bonus game, several resultant symbols may be collected on a given free spin. In another example, the EGM(s) of the player(s) who triggered the free spin bonus are configured to generate and display the first symbol and the remaining EGMs are configured to generate and display the second symbol.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 10A:
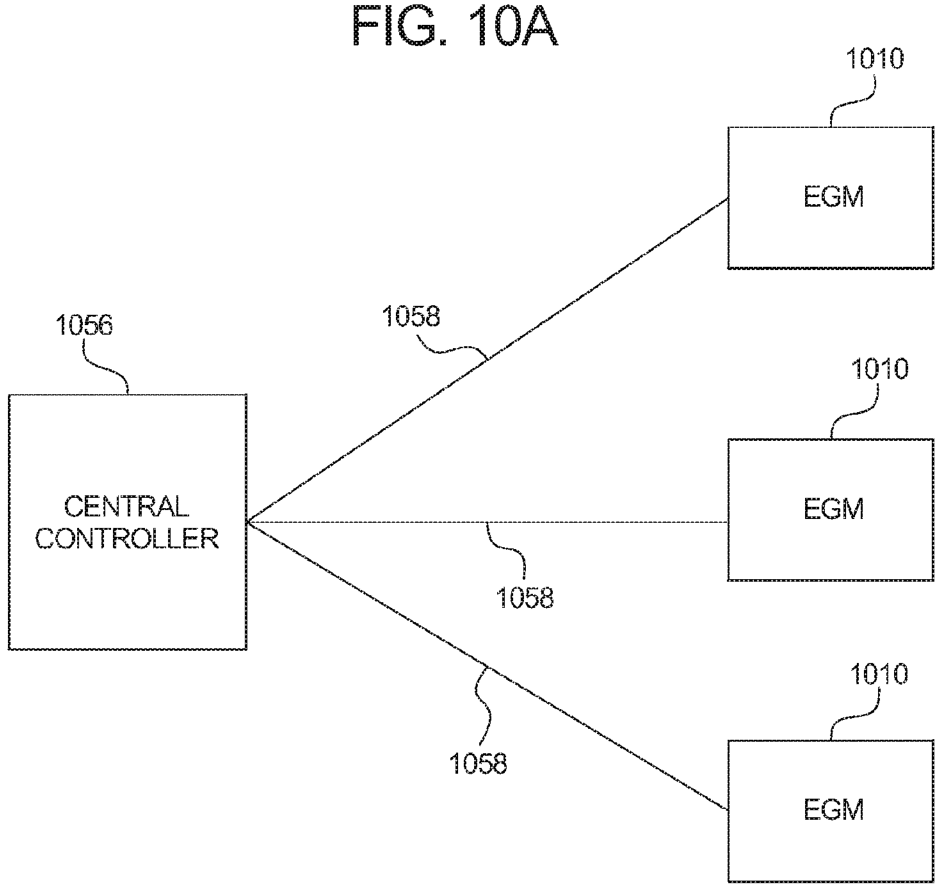
FIG. 10A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 10A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 10B:
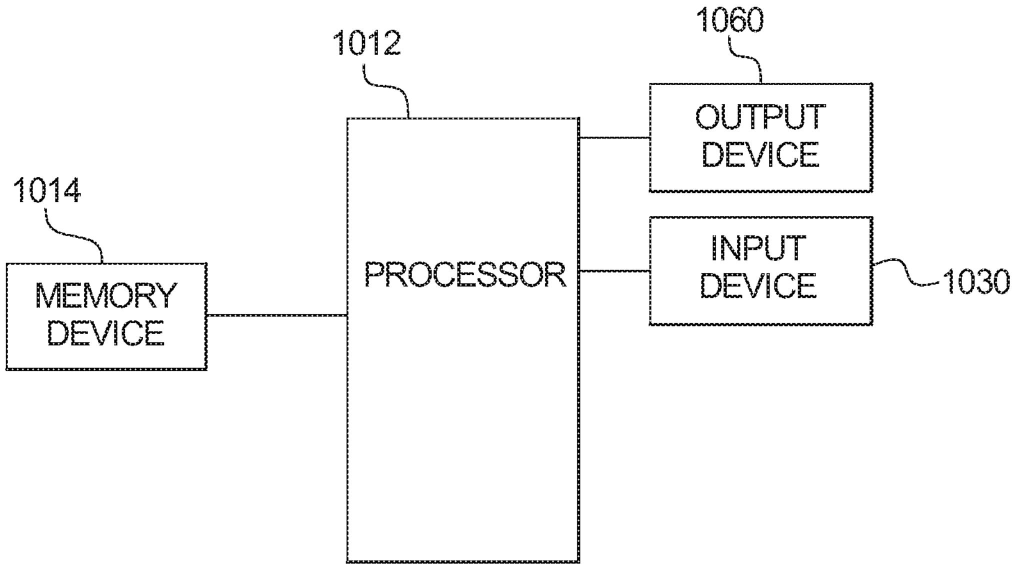
FIG. 10B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 10B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 10B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 11A:
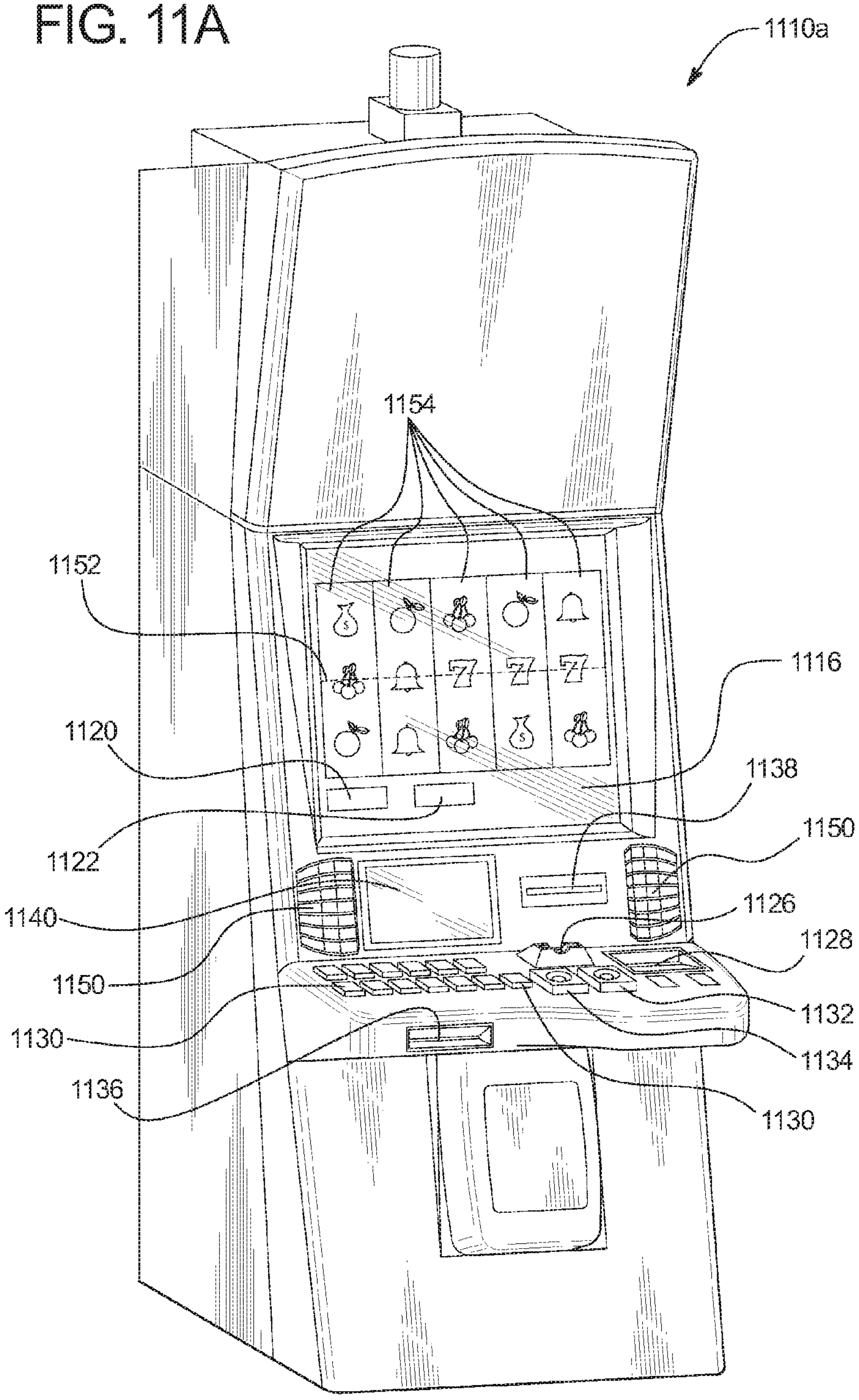
FIGS. 11A and 11B are perspective views of example alternative embodiments of the gaming system of the present disclosure.
Figure 11B:
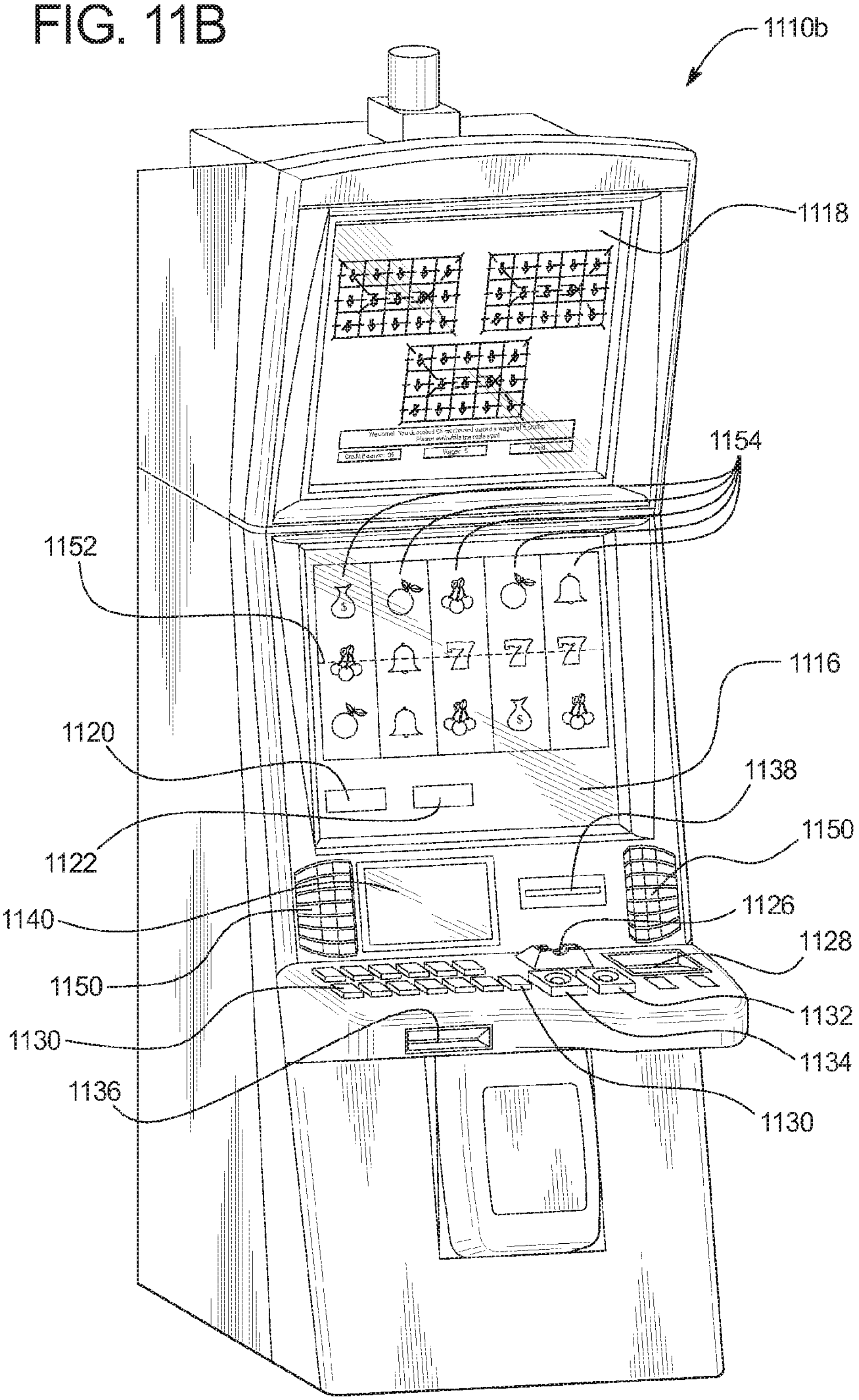

In various embodiments, the EGM includes one or more input devices. The input devices may include any suitable device that enables an input signal to be produced and received by the at least one processor of the EGM. The example EGM illustrated in FIG. 10B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 11A and 11B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 11A and 11B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 11A and 11B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 11A and 11B each include a card reader 1138. The card reader is configured to read a player identification card inserted into the card reader.

In various embodiments, the EGM includes one or more output devices. The example EGM illustrated in FIG. 10B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 11A includes a central display device 1116, a player tracking display 1140, a credit display 1120, and a bet display 1122. The example EGM illustrated in FIG. 11B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 11A and 11B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 11A and 11B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 11A and 11B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 11A and 11B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S.

Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 11A and 11B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device that stores a plurality of instructions that, when executed by the at least one processor, cause the at least one processor to, for a play of a game:

randomly determine a first plurality of symbols from a first set of symbols;

cause the at least one display device to display the first plurality of symbols at a first plurality of symbol display areas;

randomly determine a second plurality of symbols from a second set of symbols;

cause the at least one display device to display the second plurality of symbols at a second plurality of symbol display areas;

for each of at least one of the first plurality of symbol display areas, responsive to the symbol displayed at that symbol display area having one of a set of one or more designated relationships with the symbol displayed at an associated symbol display area of the second plurality of symbol display areas, form a resultant symbol from those symbols based on that designated relationship;

determine any awards based on any resultant symbols and not based on any non-resultant symbols; and cause the at least one display device to display any determined awards.

2. The gaming system of claim 1, wherein the plurality of instructions, when executed by the at least one processor, cause the at least one processor to, for the play of the game, determine at least one designated relationship of the set of one or more designated relationships from a plurality of different designated relationships.

3. The gaming system of claim 2, wherein the plurality of instructions, when executed by the at least one processor, cause the at least one processor to, for the play of the game, randomly determine the at least one designated relationship from the plurality of different designated relationships.

4. The gaming system of claim 1, wherein the set of one or more designated relationships includes only one designated relationship.

5. The gaming system of claim 4, wherein the plurality of instructions, when executed by the at least one processor, cause the at least one processor to, for the play of the game, determine the only designated relationship of the set of one or more designated relationships from a plurality of different designated relationships.

6. The gaming system of claim 1, wherein the set of one or more designated relationships includes two or more designated relationships.

7. The gaming system of claim 6, wherein the plurality of instructions, when executed by the at least one processor, cause the at least one processor to, for the play of the game, determine at least one of the two or more designated relationships of the set of one or more designated relationships from a plurality of different designated relationships.

8. The gaming system of claim 1, which includes an acceptor, and wherein the plurality of instructions, when executed by the at least one processor, cause the at least one processor to:

establish a credit balance based at least in part on a monetary value associated with a physical item responsive to receipt of the physical item by the acceptor, wherein the physical item is one of: a ticket associated with the monetary value, and currency;

apply a wager for the play of the game responsive to an actuation of a wager button, the credit balance decreasable by the wager, the credit balance increasable by any determined awards; and initiate a payout associated with the credit balance responsive to an actuation of a cashout button.

9. The gaming system of claim 1, wherein two different designated relationships are associated with two different types of resultant symbols.

10. A method of operating a gaming system, the method comprising:

for a play of a game, randomly determining, by at least one processor, a first plurality of symbols from a first set of symbols;

displaying, by at least one display device, the first plurality of symbols at a first plurality of symbol display areas;

randomly determining, by the at least one processor, a second plurality of symbols from a second set of symbols;

displaying, by the at least one display device, the second plurality of symbols at a second plurality of symbol display areas;

for each of at least one of the first plurality of symbol display areas, responsive to the symbol displayed at that symbol display area having one of a set of one or more designated relationships with the symbol displayed at an associated symbol display area of the second plurality of symbol display areas, forming, by the at least one processor, a resultant symbol from those symbols based on that designated relationship;

determining, by the at least one processor, any awards based on any resultant symbols and not based on any non-resultant symbols; and displaying, by the at least one display device, any determined awards.

11. The method of claim 10, which includes determining, by the at least one processor and for the play of the game, at least one designated relationship of the set of one or more designated relationships from a plurality of different designated relationships.

12. The method of claim 11, which includes randomly determining, by the at least one processor and for the play of the game, the at least one designated relationship from the plurality of different designated relationships.

13. The method of claim 10, wherein the set of one or more designated relationships includes only one designated relationship.

14. The method of claim 13, which includes determining, by the at least one processor and for the play of the game, the only designated relationship of the set of one or more designated relationships from a plurality of different designated relationships.

15. The method of claim 10, wherein the set of one or more designated relationships includes two or more designated relationships.

16. The method of claim 15, which includes determining, by the at least one processor and for the play of the game, at least one of the two or more designated relationships of the set of one or more designated relationships from a plurality of different designated relationships.

17. The method of claim 10, which includes:

receiving, by an acceptor, a physical item associated with a monetary value;

establishing, by the at least one processor, a credit balance based at least in part on the monetary value associated with the physical item responsive to receipt of the physical item by the acceptor, wherein the physical item is one of: a ticket associated with the monetary value, and currency;

applying, by the at least one processor, a wager for the play of the game responsive to an actuation of a wager button, the credit balance decreasable by the wager, the credit balance increasable by any determined awards; and initiating, by the at least one processor, a payout associated with the credit balance responsive to an actuation of a cashout button.

18. The gaming system of claim 10, wherein two different designated relationships are associated with two different types of resultant symbols.

19. The method of claim 10, which is at least partially provided through a data network.

20. The method of claim 19, wherein the data network is an internet.

21. A gaming system comprising:

a processor; and a memory device which stores a plurality of instructions, which when executed by the processor, cause the processor to:

randomly determine a first plurality of symbols from a first set of symbols;

communicate first data which results in a display device of a mobile device displaying the first plurality of symbols at a first plurality of symbol display areas;

randomly determine a second plurality of symbols from a second set of symbols;

communicate second data which results in the display device of the mobile device displaying the second plurality of symbols at a second plurality of symbol display areas;

for each of at least one of the first plurality of symbol display areas, responsive to the symbol displayed at that symbol display area having one of a set of one or more designated relationships with the symbol displayed at an associated symbol display area of the second plurality of symbol display areas, form a resultant symbol from those symbols based on that designated relationship;

determine any awards based on any resultant symbols and not based on any non-resultant symbols; and communicate third data which results in the display device of the mobile device displaying any determined awards.

22. The gaming system of claim 21, wherein the plurality of instructions, when executed by the processor, cause the processor to, for the play of the game, determine at least one designated relationship of the set of one or more designated relationships from a plurality of different designated relationships.

23. The gaming system of claim 21, wherein the plurality of instructions, when executed by the processor, cause the processor to, for the play of the game, randomly determine the at least one designated relationship from the plurality of different designated relationships.

24. The gaming system of claim 21, wherein the set of one or more designated relationships includes only one designated relationship.

25. The gaming system of claim 24, wherein the plurality of instructions, when executed by the processor, cause the processor to, for the play of the game, determine the only designated relationship of the set of one or more designated relationships from a plurality of different designated relationships.

26. The gaming system of claim 21, wherein the set of one or more designated relationships includes two or more designated relationships.

27. The gaming system of claim 26, wherein the plurality of instructions, when executed by the processor, cause the processor to, for the play of the game, determine at least one of the two or more designated relationships of the set of one or more designated relationships from a plurality of different designated relationships.

28. The gaming system of claim 21, wherein two different designated relationships are associated with two different types of resultant symbols.

29. The gaming system of claim 21, wherein when executed by the processor, the plurality of instructions cause the processor to communicate with the mobile device via a wireless network.

* * * * *